United States Patent [19]
Wadhwa et al.

[11] Patent Number: 5,295,222
[45] Date of Patent: Mar. 15, 1994

[54] COMPUTER-AIDED SOFTWARE ENGINEERING FACILITY

[75] Inventors: Vivek K. Wadhwa, Paramus, N.J.; Faraz Ataie, Brooklyn, N.Y.; Vincent P. Aubrun, New York, N.Y.; Leonid Erlikh, Brooklyn, N.Y.; Michael Fischer, Passaic, N.J.; Michael Fochler; Craig B. Hayman, both of New York, N.Y.; Daniel Hildebrand, Stamford, Conn.; James Hughes, Hartsdale, N.Y.; Jeffrey L. Lambert, East Brunswick, N.J.; Douglas E. Lee, White Plains, N.Y.; Nicholas R. Lim, London, England; Rajan S. Modi, New York, N.Y.; Richard W. Mosebach, Hicksville, N.Y.; Joel M. Moskowitz, New York, N.Y.; Tayo Olowu, New York, N.Y.; Elaine C. Power, New York, N.Y.; Norman Shing, New Hyde Park, N.Y.

[73] Assignee: Seer Technologies, Inc., New York, N.Y.

[21] Appl. No.: 885,924

[22] Filed: May 18, 1992

Related U.S. Application Data

[63] Continuation of Ser. No. 444,060, Nov. 30, 1989, abandoned.

[51] Int. Cl.⁵ .......................................... G06F 15/60
[52] U.S. Cl. ...................................... 395/1; 395/700
[58] Field of Search ................ 395/700, 1; 364/280.6, 364/274.1, 274.2, 274.3, 274.4, 274.5

[56] References Cited

U.S. PATENT DOCUMENTS

| | | | |
|---|---|---|---|
| 4,455,619 | 6/1984 | Masui et al. | 364/900 |
| 4,558,413 | 12/1985 | Schmidt et al. | 364/300 |
| 4,734,854 | 3/1988 | Afshar | 364/200 |
| 4,809,170 | 2/1989 | Leblang et al. | 364/200 |
| 4,833,604 | 5/1989 | Cheng et al. | 364/200 |
| 4,862,345 | 8/1989 | Lekrom | 364/900 |
| 4,866,638 | 9/1989 | Cosentino et al. | 364/900 |
| 4,888,690 | 12/1989 | Huber | 364/200 |
| 4,893,232 | 1/1990 | Shimaoka et al. | 364/200 |
| 4,894,771 | 1/1990 | Kunii et al. | 364/200 |
| 4,930,071 | 5/1990 | Tou et al. | 364/300 |
| 4,939,689 | 7/1990 | Davis et al. | 364/300 |
| 4,956,773 | 9/1990 | Saito et al. | 364/200 |
| 5,084,813 | 1/1992 | Ono | 395/1 |
| 5,202,996 | 4/1993 | Sugimo et al. | 395/700 |

Primary Examiner—Dale M. Shaw
Assistant Examiner—C. Shin
Attorney, Agent, or Firm—Kenyon & Kenyon

[57] ABSTRACT

A computer-aided software engineering facility and method for creating computer source code and executable computer programs that are distributable across multiple hardware environments or platforms. An object oriented modeling system is linked with modules of a computer programming language and other system components to quickly and efficiently design computer source code and executable computer modules that have a high degree of reusability. The modules and models are stored in a centralized storage area and distributed to the various hardware elements that comprise the computer system.

30 Claims, 7 Drawing Sheets

COMPUTER-AIDED SOFTWARE ENGINEERING FACILITY

This is a continuation of application Ser. No. 07/444,060, filed Nov. 30, 1989, entitled COMPUTER-AIDED SOFTWARE ENGINEERING FACILITY, now abandoned.

FIELD OF INVENTION

The invention relates to multiprocessor computer systems and in particular to facilities that aid in the development of computer programs for those systems.

BACKGROUND OF THE INVENTION

Computer-Aided Software Engineering (CASE) software or "facilities" assist computer programmers or system developers in the design, development and testing of a computer program.

Traditionally, the steps necessary to implement a computer program were performed manually. Design teams follow a number of discrete steps to create a useful application program from a nascent idea The analysis begins by manually developing a model in which a problem can be solved by computer. Design teams evaluate the needs of the prospective users and the properties that the computer system should possess to meet those needs.

In the technical design phase of development, developers begin to define how the application program will be built on a given system. They manually determine the procedural and data elements needed and how the data and procedures will be assembled to form the software solution. At this phase the two major tasks are data-modeling and process-modeling.

With the basic design of the program modeled, developers then begin the task of coding the program. Computer programs are generally written in high-level programming language such as BASIC, C, COBOL, FORTRAN or PL/I. The task of reducing the theoretical design of an application to working code is an arduous task that requires many man-hours. Experience in the programming language used to develop the program is necessary.

With the code written, the design team's next problem is to debug the program for syntax errors, and then test the program to determine whether the application performs the desired function. Typically, the debugging and testing phase requires the programmer to evaluate a program at the code level.

The programmer's development tasks become more challenging with the use of multiprocessing systems architecture.

Traditionally, there have been two basic hardware configurations employed in the design of computer systems for multiple users. In one configuration all of a system's processing is performed by one large "mainframe" computer. Each user accesses that system through non-processing terminals.

A network system is the second traditional hardware configuration. A network is comprised of a number of individual processing units that are interconnected to allow the sharing of data and software. There may be additional processors to maintain a group's centralized database and additional processors may be dedicated to the maintenance of the system's operation. The use of a network of processors each dedicated to specific aspects of a computer system is the essence of multiprocessing.

The growth of the use of multiprocessing systems can be traced to the proliferation and development of powerful "micro" or "personal" computers (PC's). Within certain constraints, a PC can perform many of the same processing tasks that mainframe or mini computers do. However, a PC can perform these tasks with substantial savings of instructions executed by the computer, measured in millions of instructions per second, "MIPS". Moreover, unlike a mainframe system, a PC is dedicated to a single user. An efficient multiprocessing system encourages data sharing and the use of dedicated PC's for as many tasks as possible.

In multiprocessor systems, an application may be executed on more than one processor. When various parts of an application program are executed on separate processors, the application is "distributed." Distributed processing can be executed either in a serial sequence or in parallel.

The simultaneous execution of a program on many processors is parallel processing. Sequential execution of a program across different hardware environments is serial or "cooperative" processing.

Multiprocessing capability brings new challenges to computer system designers. Whereas in a mainframe environment all parts of the program were programmed for a single environment, in multiprocessing systems designers can choose the particular environment where specific aspects of a program will run.

Although this freedom to distribute the program results in a highly efficient application, the programmers must now construct programs designed to execute in many hardware environments.

The task of programming multiprocessing systems involves difficult problems of swapping data across different, and incompatible environments. For example, a file containing data stored in a PL/I format is not readable by a program written in a different language such as C or COBOL. A programmer must design special software to handle the communication problems inherent in multiprocessing systems.

In addition, a programmer must code the various distributed programs in the language supported by that environment. For example, if the PC processors support only programs written in C language, those parts of the program must be in C. Whereas the other parts of the program, such as those on the mainframe, may have to be written in another programming language.

Programming in a multiprocessor environment is very complex and time consuming. Staffing requirements for designing an application in a multiprocessor environment alone can make the task cost prohibitive. CASE facilities were created to alleviate some of the burden multiprocessing architecture placed on the programmer.

Traditionally, CASE facilities allow a user to input a high-level logical design of a program which is then translated into code in a particular computer language. However, the CASE facilities currently available do not give the system developer a complete integrated system for the design, implementation and maintenance of a software application. The current facilities do not support the development of a program in a centralized location and where translated code is created and distributed to various environments. The current CASE tools also do not provide a method for re-using parts of a previously developed application that may be usable in an application under development. The current CASE facilities do not provide adequate testing and debugging tools.

SUMMARY OF THE INVENTION

The present invention is a CASE facility providing a method and apparatus for designing, implementing and maintaining software that runs in multiple hardware environments—a distribution that is transparent to the end-user.

One aspect of the invention is a method of modeling the program structure and the data used by the program through an entity-relationship modeling technique.

Another aspect is a relational database, where data is stored according to the entity-relationship model.

Another aspect is the high-level Rules Language in which the logic of a program can be specified in a highly modular form, promoting ease of re usability.

The invention provides the capability for generating source-code for the program in a language supported by various hardware entities in the multiprocessing system, using the entity-relationship model and the high-level Rules Language modules.

To generate the program's source-code the invention provides basic program elements to execute the program in a multiprocessing environment. These program components and low-level routines are combined with the Rules Language modules and data type entities to create the program.

The invention further provides facilities to distribute, assemble and compile the program developed using the CASE facility of the present invention, as well as test and modify the program.

DETAILED DESCRIPTION OF THE INVENTION

A. Hardware

Figure 1:
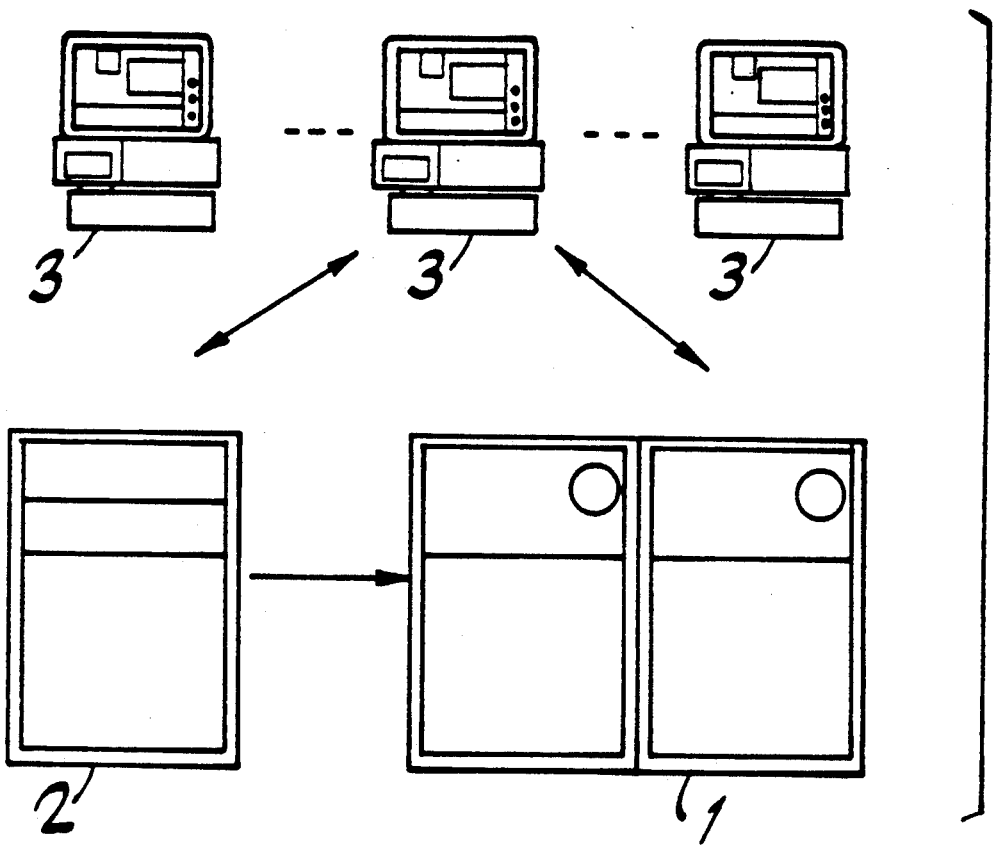
FIG. 1 is an illustration of a three-tiered computer system.

A typical hardware configuration for a computer system using the CASE facility of the present invention is shown in FIG. 1. The figure describes a "three tiered" computer system, named for the three distinct types of processors networked: the mainframe computer 1, as for example, an IBM 3090, a mini or supermini computer 2, as for example an IBM S/88 or Stratus, and a plurality of micro-computer workstations 3, as for example IBM PC workstations. A system using the CASE facility of the present invention is not limited to only this hardware configuration. For example, a similar CASE facility can be constructed to develop code distributed in a two-tiered environment such as a system employing only a mainframe and PC workstations. The CASE facility can be tailored to fit any hardware configuration. The basic principles of code generation, the maintenance of a centralized database and the use of a rules-based language used in this invention are the same regardless of a particular hardware configuration.

Flexibility in hardware configuration is one advantage of the CASE facility according to the present invention over those CASE facilities currently available. The CASE facility of the present invention allows flexible architectural designs by creating a centralized data base called a Repository where the logic of the programs is stored, and translated code is distributed automatically to the different hardware environments.

Typical processors preferred for each of these tiers are the IBM mainframe sold under the trademark "Model 3090", running the IBM MVS/XA operating system; the Stratus minicomputer sold under the trademark "Model XA2000", running the Stratus Computer, Inc. VOS operating system, and the IBM micro-computer sold under the trademark "PS2", executing the Microsoft Corporation operating system sold under the trademark "MS-DOS." (For further information on these processors or their operating systems, the reader is referred to the following publications that are hereby expressly incorporated by reference: "IBM System/370 Bibliography", document number 6024448; and "Introduction to VOS", by Stratus Computer, Inc., document number R0001.)

B. CASE Facility Elements

Figure 2:
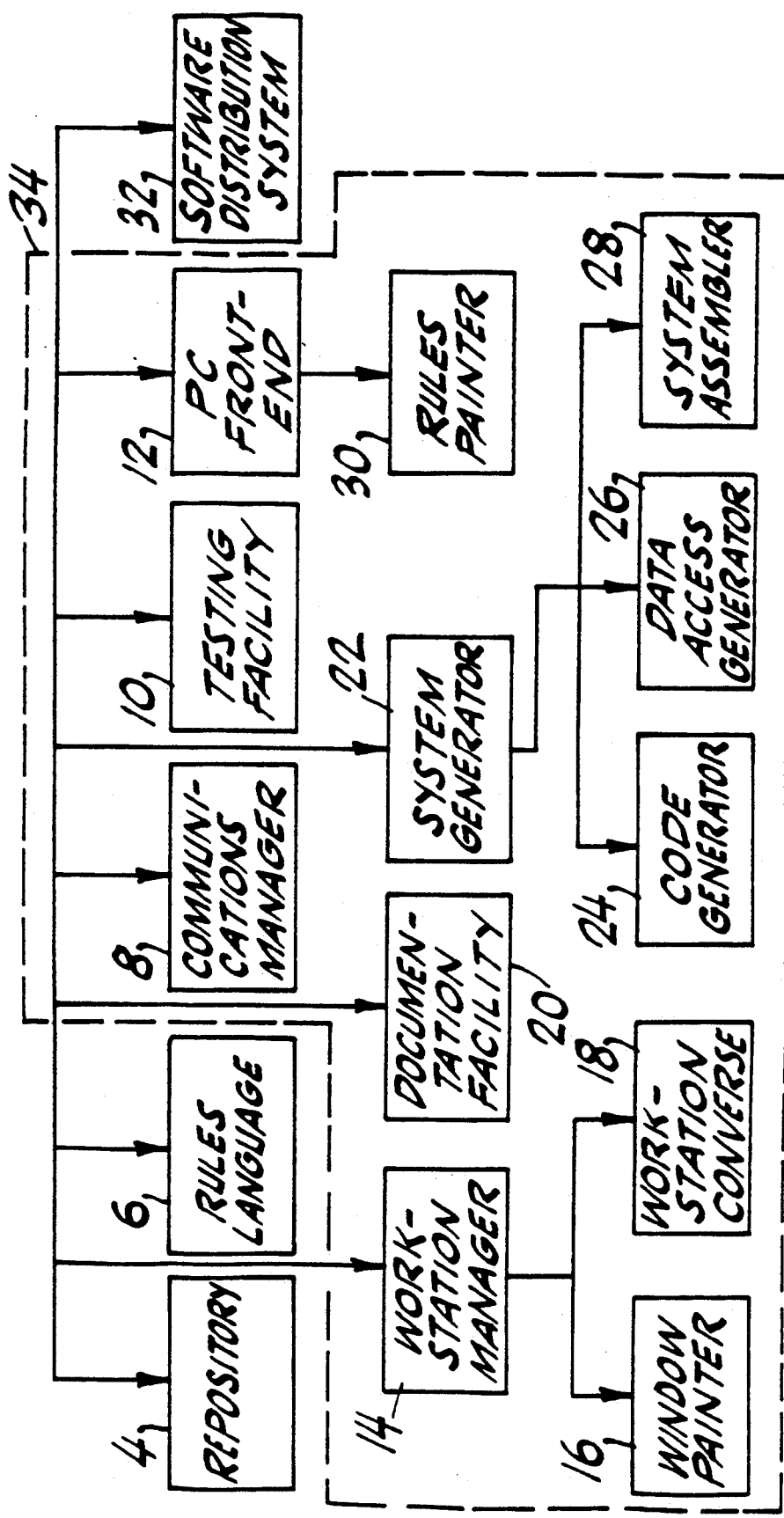
FIG. 2 is a diagrammatic representation of the program elements according to the present invention.
Figure 2A:
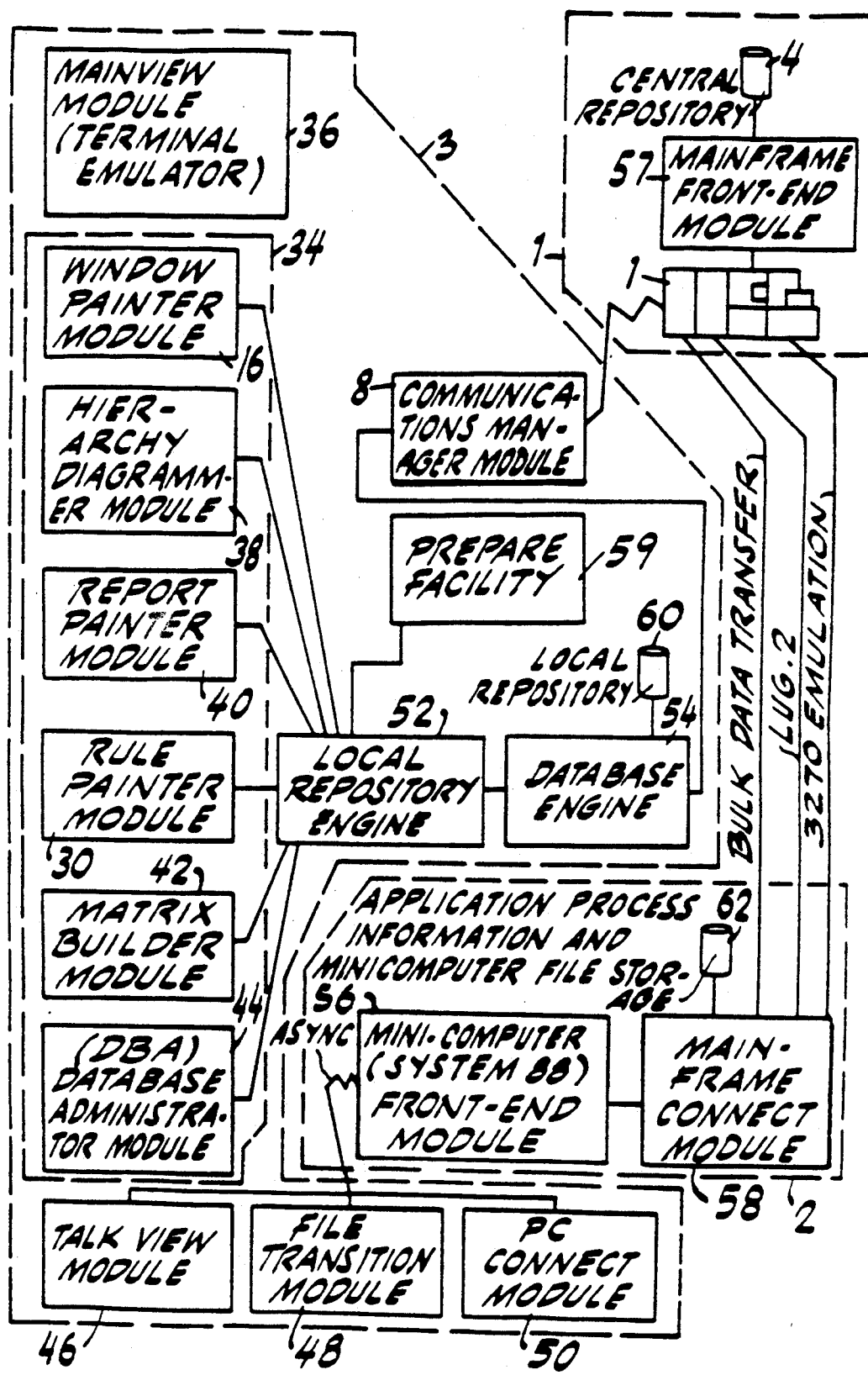

The CASE facility of the present invention comprises a number of programmed elements, as depicted in FIG. 2: a Repository 1; a Rules Language 2; a Communications Manager 3; a Testing/Debugging Facility 4; a PC User-Interface Facility 5, including a Rules Painter 6; a Work Station Utility comprising a Work Station Manager 7, a Window Painter 8, and a Workstation Converse 9; a Documentation Facility 10; and a Systems Generator 11 including a Code Generator 12, a Data Access Generator 13, and Systems Assembler 14. Although the programs created by the CASE facility are centrally-stored, the CASE system program elements may be located in any of the hardware environments used in a configuration.

The Repository 1 is a central database used to store all information about all of the application programs created with the CASE facility of the present invention. The Repository 1 could exist in any hardware environment supporting a standard relational database. For example on the three-tiered environment shown in FIG. 1, the Repository could exist on the mainframe computer 1, using the IBM relational database management system DB2.

For purposes of a preferred embodiment of this invention, it is preferred that the IBM relational database sold under the trademark "DB2" be employed. (For background information on DB2, the reader is referred to the following IBM publications which are hereby expressly incorporated by reference: "IBM DATABASE 2 Introduction to SQL" (document number GC26-4082); "IBM DATABASE 2 Reference" (document number SC26-4078); "OS/VS2 TSO Command Language Reference" (document number GC28-0646); "TSO Extensions Command Language Reference" (document number SC28-1307); "Interactive System Productivity Facility/Program Development Facility for MBS: Program Reference" (document number SC34-2089); "Interactive System Productivity Facility/Program Development Facility of MVS: Dialog Management Services" (document number SC34-2137) and "DB2 Application Programming Guide for TSO and Batch Users."

The information stored in the Repository 1 includes models provided by the present invention to form the basis for an application program and high-level logic modules defined by the present invention for use in the generation of an executable program, as will appear. For each program, a data-model and a process-model are developed through the use of an entity-relationship modeling system and stored in the Repository 1. The high-level logic modules stored in the Repository 1 are written in a Rules Language defined by the present invention as described below. The information is environment independent and is structured to provide a high degree of re-use.

Programmers input information to the Repository 1, using a standard database language supported by the hardware. For example where the Repository 1 is constructed from an IBM DB2 data base, a programmer would use the DB2 Structured Query Language, SQL, to model the application.

The Rules Language 2 is a high-level language that permits users to specify the logic of a program, independent of the hardware devices used by the system. Program modules written in the Rules Language are translated by the Code Generator 12 into computer code suitable for execution in an environment where the modules are to run. The Rules Language is described more fully below.

The Communications Manager 3 performs the run-time transfer of information between hardware environments. For example the Communications Manager 3 would use routers and protocols to handle data transfers between a mainframe, a mini computer and PC Workstations. The Testing Facility 4 known as Rule View enables programmers to step through and debug program code. Rule View can create test data as well as provide regression and stress testing upon an application. The Rule View is explained more fully below.

The PC Front-End 5 allows PC based graphic interface to be used for all CASE tool functions. The Rules Painter 6 permits programmers to construct program modules by manipulating graphic representations of the Rules Language statements. The PC Front-End 5 eliminates the need for the programmer to know an operating system language, such as DOS, by offering all PC functions as menus.

The Workstation Manager 7 aids in managing user interface in a PC environment. The window Painter 8 is a tool that helps the developer to create user-interface screens for applications. The Workstation Converse 9 manages the display and validation of screen information.

The Workstation Manager 7 works in combination with commercialized programs to design user-interface, such as, for example, Microsoft Windows. All of the complexities of using a commercial design tool, like Microsoft Windows, are managed by the Workstation Manager 7.

In designing an application or portion thereof for execution on an "IBM PC," it is preferred that the Microsoft Corporation's Window program, sold under the trademark "MICROSOFT WINDOWS," be used. (For more background information on MICROSOFT WINDOWS, the reader is referred to the following Microsoft Corporation publications which are hereby incorporated by reference: "Microsoft Windows Programmer's Utility Guide"; "Microsoft Windows Application Style Guide"; Microsoft Windows Programmer's Reference"; and "Microsoft Windows Quick Reference.")

The Documentation Facility 10 generates all technical documentation for a program under development. Documentation includes functional decomposition of the system and hierarchy listings of the Rule Language modules.

The System Generator 11 includes the Code Generator 12, the System Assembler 14, and the Data Access Generator 13. The Code Generator 12 translates the Rules Language modules into code in an appropriate programming language. The System Assembler 14 brings the various coded program elements together to form an application program. The Data Access Generator 13 allows the program to access date across hardware environment. Code generation and program execution is discussed more fully below.

The Software Distribution System 15 automates and controls migration of an application. The system manages the release of software to targeted computers. The Software Distribution System 15 solves the problem of synchronizing distribution of software located, for example, on hundreds of personal computers. For a more detailed description of a Software Distribution System see U.S. application Ser No. 07/444,102, entitled "Software Distribution System;" filed on even date herewith in the name of Norman Shing et al., which is hereby expressly incorporated by reference.

C. Entity-Relationship Modeling

1. Entities and Relationships

A feature of the CASE facility of the present invention is the systems model. To design any application using the CASE facility, a developer must decompose the application into specified logical parts, and assemble them into a program. The data used by a program are stored in Repository 1, FIG. 2, according to an entity-relationship model of the present invention. The different parts of an application are expressed as entities and are linked by relationships.

Defined generally, an entity is something real or abstract about which information is recorded. The information is organized into a set of characteristics, known as attributes. For example, collected information about employees of a company could be placed in an entity type called Employee. The attributes for that entity could be a name, social security number, home address, age, birth date, department, etc. An entity called Organization would include attributes such as organization name, address, type of organization (such as partnership or corporation), etc. This data is stored in a file in the Repository 1 (see FIG. 2).

An association between entities is known as a relationship. For example in FIG. 3 the entity, Organization 1, is now linked to the entity, Employee, by the relationship, Employs 3. Relationships are also defined by attributes.

2. Functional Design

The functional design phase begins the modeling task—there are two tasks to perform: data-modeling and process-modeling.

Figure 4:
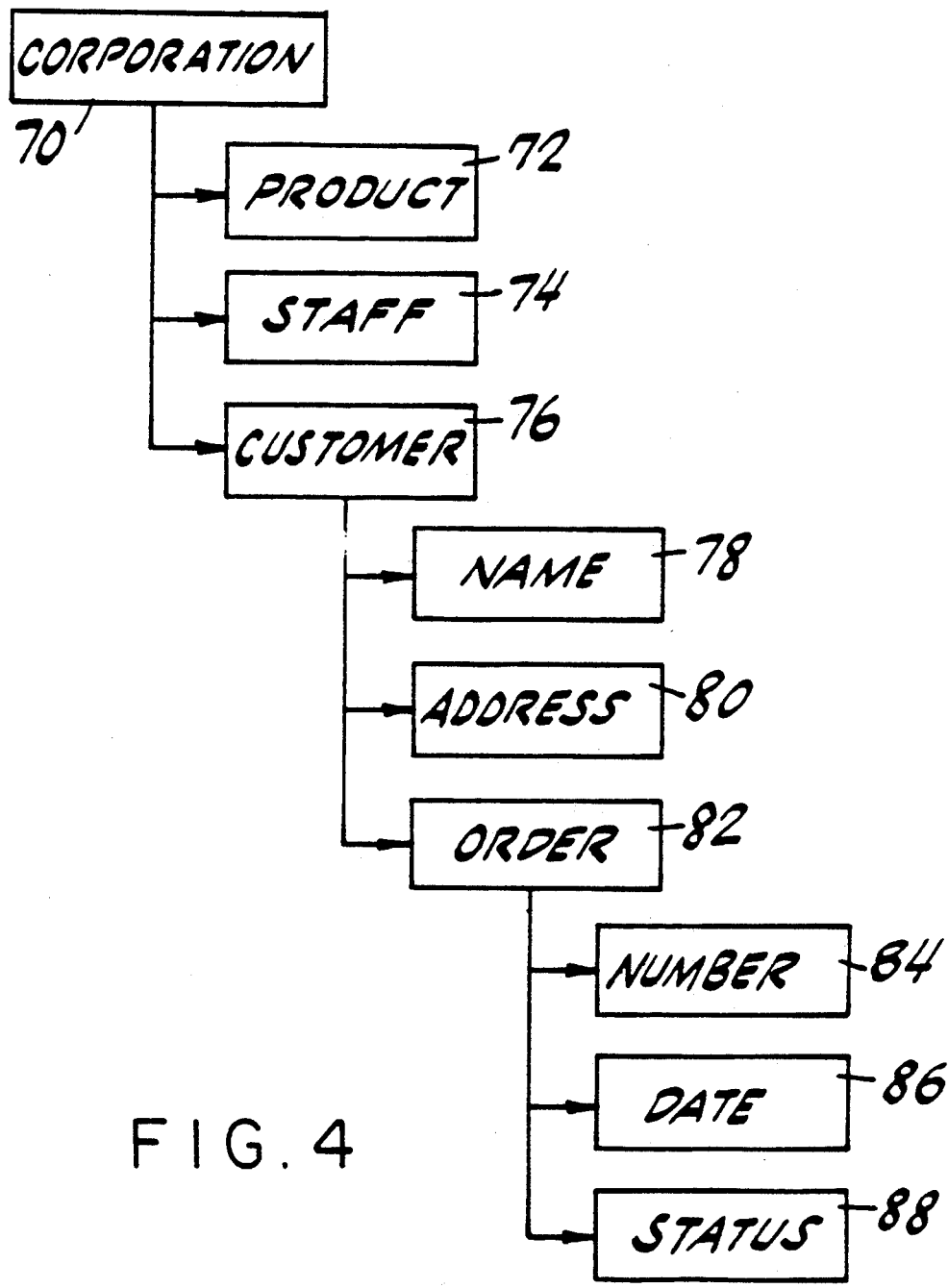
FIG. 4 is a diagrammatic representation of a sample entity decomposition according to the present invention.

Data-modeling is the method of creating an entity-relationship model for the real-world data to be used by an application program. The method involves identifying an entity, such as a corporation, and decomposing that entity into subentities and attributes. In FIG. 4, the example entity, Corporation 1, is made up of the entities: Product 2, Staff 3, and Customer 4. Customer consists of the attributes: Name 5, and Address 6, and the Entity, Order 7. The Order entity is composed of the attributes Number 8, Date 9, and Status 10.

Figure 3:
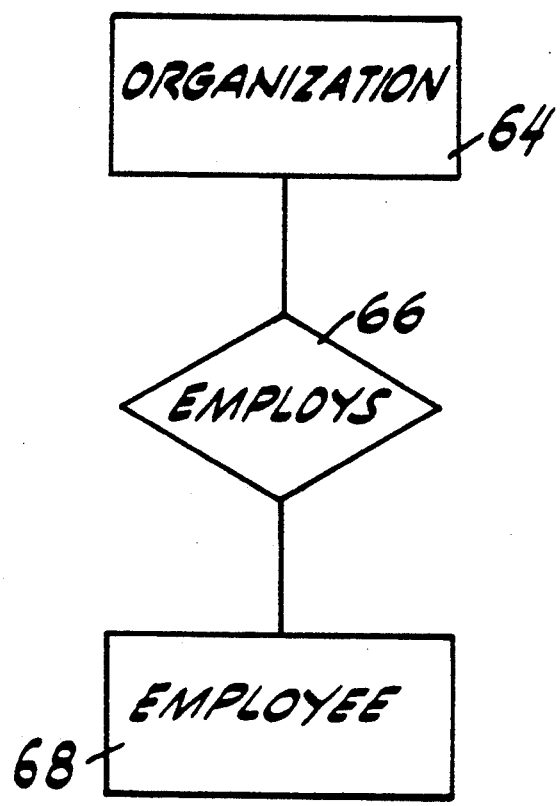
FIG. 3 is a diagrammatic representation of a sample entity-relationship according to the present invention.

Once the programmer has modeled the real-world data elements, he or she links them using the relationships such as the Employs Relationship 3 illustrated in FIG. 3.

In model format, the data are stored in the Repository 1, (See FIG. 2). Using the entity-relationship modeling technique, data for any application can be stored and readily re-used in subsequent applications.

Process-modeling is the method of constructing a model of an application program, using an entity-relationship model. The CASE facility of the present invention requires that all applications be first reduced to an entity-relationship model, before a programs logic is specified. The entity-relationship model is not the actual program. It is separate from the program modules written in the Rules Language. However, the CASE facility uses the entity-relationship model to link the various program modules together as well as to construct and distribute the program through a multiprocessor system. Entities store information on the flow of a program, the data structures used, the user interface, the environments used by the modules and the multiprocessing needs of the program.

In addition the entity-relationship model provides a representation of the high-level design of the programs from the entities. The CASE facility can produce technical documentation from the process model. For a given application, the entity-relationship model implicitly represents an amalgamation of a high-level structure-chart and a detailed description of the logic and data requirements necessary to make a program run.

The process-modeling method allows users of the CASE facility to maximize efficiency by re-using program elements. The program resulting from the entity-relationship model is highly modular. Because all programs developed with the CASE facility presented by this invention use the same entity types and relationships it is likely that many of the program elements can be re-used.

D. Application Model Entities and Relationship

Figure 5:
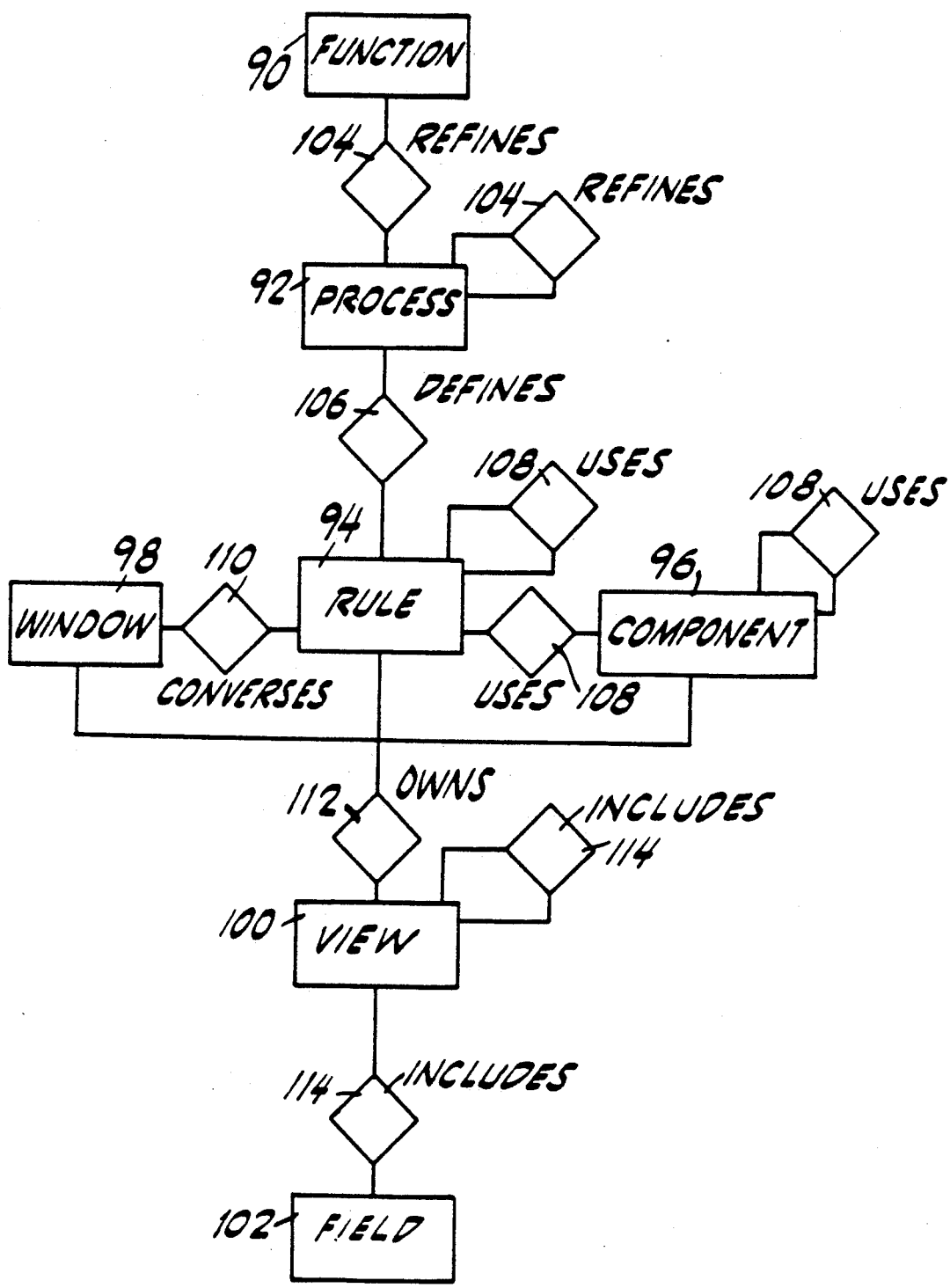
FIGS. 5 and 6 are diagrammatic representations of the entity-relationship model for application programs according to the present invention.
Figure 6:
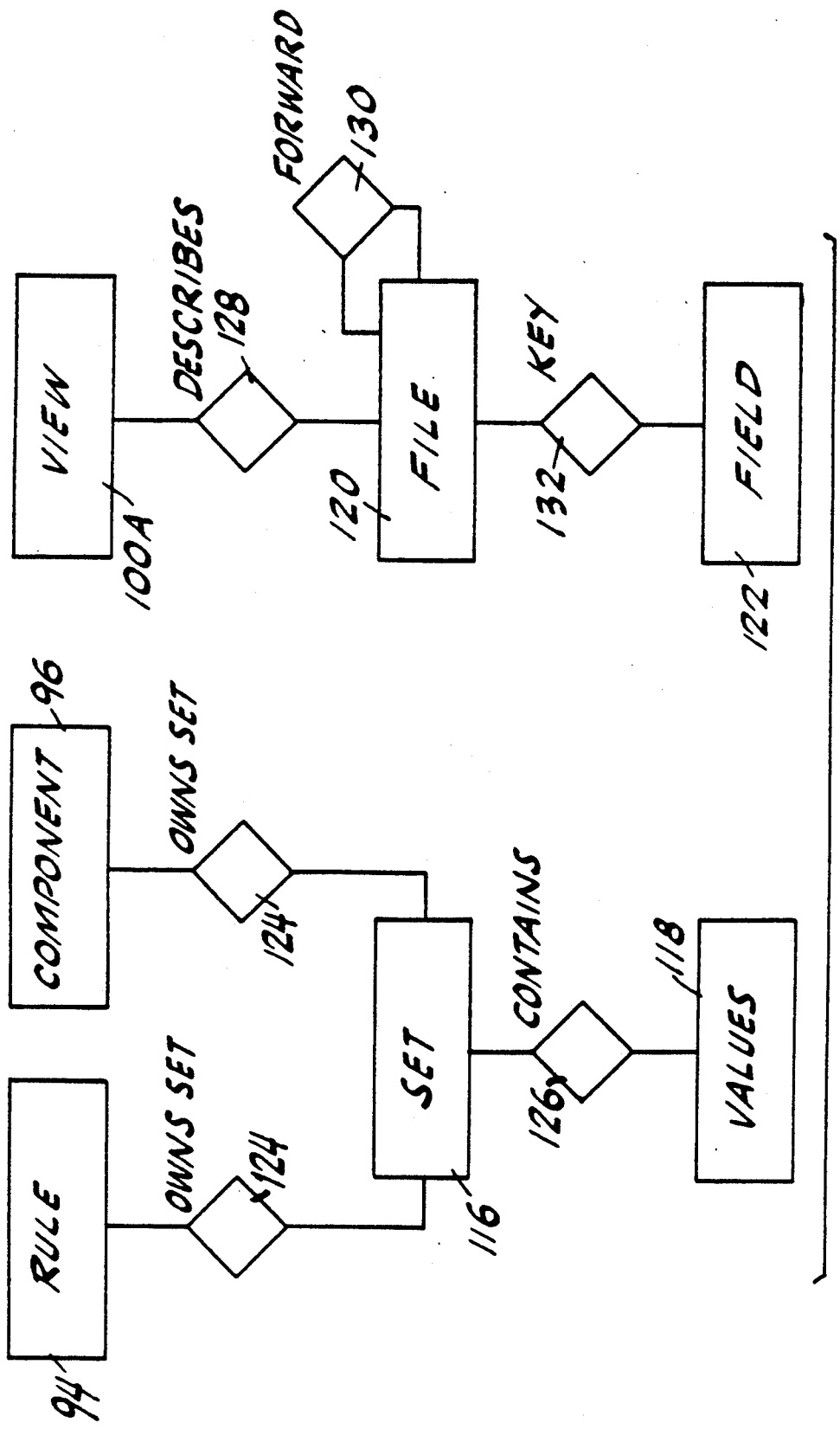

All programs built using the CASE facility are broken into ten entity-types and eleven relationships as shown in FIGS. 5 and 6. For each entity and relationship that defines an application a list of attributes and information is kept.

1. Entities

The Function Entity 1, FIG. 5, is a listing of all the application programs currently on the system. A Function 1 is defined by the following attributes: Function Name, Test Description and Application Identification.

A Process 2, FIG. 5, is a logical subdivision of a Function 1. A Function 1 typically is decomposed into two or more Processes 2. Processes 2 can be decomposed into lower level Processes 2 (sub-processes). When a Process 2 is related to another Process, the relationship is always hierarchical. There are three Process types: Root, Leaf and Node. Such relationships define the decomposition of one sub-system into others. The Process Entity 2 is defined by the attributes: Process Name, Description, Menu Description, Sub-Process Menu-Type and Sequence Number.

At runtime, a process runs either as a foreground or background process. A Foreground Process is one that executes interactive communication with the end-user. For example, a Foreground Process may comprise the graphics functions, resident on a PC workstation 3, FIG. 1. This is the typical on-line/realtime process. In addition the foreground processes can communicate synchronously with modules on other environments, and they can receive unsolicited data, asynchronously.

A Background Process, once started, will process its input, then stop, or wait for further input. This may be a batch process for example running on the mainframe, that receives input from a file, or it may be a continuous process that runs on-line reading from a queue.

Rules are the procedural specifications of the logic of a Process. This logic is specified in a high-level language called the Rules Language. The Rules Language is based on the principles of structured design and programming. The syntax of the language along with restrictions built into the architecture ensure a highly modular and concise system specification process. The Rules Language is described in detail below.

Using Rules Language statements the CASE facility generates source code for the various environments. The CASE facility generates all code necessary to perform inter-system communication (for example, when a rule in one environment calls a rule in another), inter-process communication (for example, between different processes or regions on the same machine), program-to-program linkage, and user interface.

In the entity-relationship model only information about the Rule is stored—not the Rule language statements. A Rule Entity 3, FIG. 5, FIG. 6, is defined by its attributes: Rule Name, Rule Description, Execution Environment; and Mode of Execution (for example, synchronous or asynchronous).

As with processes there are three categories of Rules: Root, Frontier and Node Rules. A Root Rule is invoked by a Process 2. Root Rules do not have user I/O capability. A Node Rule is any rule that is not a Root or Frontier Rule.

Frontier Rules lie on the boundary of a new environment. Those Rules are grouped in a special category because Communication Manager 3, FIG. 2, must execute all Frontier Rules and their input/output data has to be converted to accommodate changes in environment.

The Rule Relationships are modeled using Rule Entities 3 and the Uses Relationship 13.

Components are modules of code written in any third generation programming language known to the CASE development system such as C, PL/I or COBOL. Components are used to perform functions not handled by the Rules Language such as calculations, database access, and calls to operating systems. The CASE facility assumes a "black box" structure for Components. A black box has fixed inputs and outputs. Given a specific input, there is always a predetermined output. The same analogy applies to Components. Components have explicitly defined inputs and outputs.

The Component Entity 4, FIG. 5, FIG. 6 contains the following attributes: Component Name; Component Description; Language Name (programming language that source code of the component is written in); and Execution Environment.

Windows define user interface. They specify what data are to be accepted from a user, how it is to be displayed, and how it is to be accepted. The Window Entity is used to store all information about a screen which is used by the Code Generator 12, FIG. 2, and workstation Converse 9, FIG. 2.

A Window Entity 5, FIG. 5 in the entity-relationship model has the following attributes: Window Name, Description. The Window Name contains the name of a Panel File also stored in the Repository which contains the information necessary to produce graphic interface using a graphic interface program such as Microsoft Windows.

The View Entity 6, FIG. 5, FIG. 6, is a convenient grouping mechanism for storing data type variables that are used by the Rules Language. The View 6 is a hierarchical set of named scalar or aggregate values.

Views 6 are is used in three different ways throughout the system. A File View 6 represents a template of the data constructs saved in a data file. The data constructs used to describe the input and output to Rules and Components are Modular Views 6. The data structures used to handle user interface are called Window Views 6.

Field Entities 7, FIG. 5, FIG. 6, are the basic data elements that comprise the variables used in a program. The Field Entity 7 stores all information about data elements, independently of the environment in which the data element is used. The Attributes of this entity define the format, editing specifications, report and screen headings, and any other generic information about a particular data element.

A Set 8, FIG. 6 like a View 6, FIG. 5, FIG. 6, is a convenient grouping mechanism that is used to store related literals or constants. Values 9, FIG. 6 are symbolic representations of literals or constants. Values 9 provide the ability or refer to specific data values by symbolic or English names. This eliminates the need to hard-code specific literal values in Rules.

Data are stored in files. In a entity-relationship model information concerning data files is stored in the File Entity 10, FIG. 6.

2. Relationships

The ten entities representing a program are linked together by one of eleven relationships.

The Refines Relationship 11, FIG. 5, describes the decomposition of Functions 1 to Processes 2. Its attributes are: Function Name (first participant); Process Name (second participant); and Sequence Number (for menu display).

The Defines Relationship 12, FIG. 5, is used to describe the relation between an abstract Process 2 and the Rule Entities 3. Its attributes are: Process Name and Rule Name.

The Uses Relationship 13, FIG. 5, is used to describe the link between one executable module and another: (e.g. Rule Uses Rule, Rule Uses Component and Component Uses Component). The attributes of a Uses Relationship are: Module Name and Sub-Module Name.

The Converse Relationship 14, FIG. 5, describes the link between a Module and a Window Entity. The attributes of the Converse 14 relation are: Rule Name (first participant) and Window Name (second participant).

The Relationship Owns 15, FIG. 5, connects entities to the Views 6 which describe their logical data interfaces. The Rule 3, Component 4, Window 5 and File 10, FIG. 6, entities may own Views. The attributes of the Owns relationship are: Rule/Component/Window or File name; Entity type (either Rule/Component/Window/or file); View Name and View Usage (either In, Out or Inout for user interface I/0).

The Includes Relationship 16, FIG. 5 connects data items together to form structures. Views 6 include sub-Views 6 and Fields 7. The Attributes of the Include Relationship 6 are: View Name (first participant higher-level view); View/Field Name (second participant); Entity Type (second participant's entity type: either view or field); Sequence Number (used to order Sub-Views and Fields); Occurs Number of Times (used to create arrays in structures).

The Owns Set Relationship 17, FIG. 6, links executable modules to the literal set values they refer to. A Rule may Own a Set by making a local declaration using the Rules Language DCL statement discussed below. The literal values will then automatically be included in the Rule Module when the code is generated. A Component Entity 4 may also Own 17 Sets 8. The Own Set Relationship Attributes are: Module Name; Module Entity Type (i.e. Rule or Component); Set Name.

The Contains Relationship 18, FIG. 6, link literal data items to a common Set 8. A Set 8 Contains 18 member Values 9. The attributes of the Contains Relationship 18 are: Set Name; Value; Symbol Name; Sequence Number.

Finally, the CASE system has file relationships: File 10, FIG. 6, is Keyed 19 by Field 7; File 10 Forwards 19 File 20; and A View 6 Describes 21 a File 21.

E. Process-Modeling Reduction Technique

All Applications developed with the CASE facility must be reduced into the above described entities and relationships. The method begins by defining the Function Entity 1, FIG. 5. A Function is equivalent to any application program to perform any task or function. The Function Entity 1 contains a generalized description of the Application. A Function is decomposed into processes. The processes represent general functions that the program must perform.

For example, one of the Process Entities in a application to perform stock market trading could be entitled "Futures Trade Entry." The Process Entities 2, FIG. 5, store information describing the process. Processes can be decomposed into further processes. On each decomposition the information about the new process is stored in a Process Entity 2.

The Function Entity 1 and the Process Entities 2 create a high-level overview of an application. During the modeling phase the CASE facility presented by this invention provides tools to aid development. The programmer can use CASE provided graphics to specify the Process 2 and Function 1 Entities and Refine Relationships 11. The user sees functions and processes listed on menus. The CASE facility also assists the analyst and user in process modeling by allowing this Function/Process decomposition to be prototyped interactively, as for example with an analyst and a programmer. The analyst can enter his thoughts, generate menus reflecting the input, and solicit input (modifications) from the programmer as to whether this is in fact the way the user envisions the way a problem is to be solved.

Once the application problem has been reduced to a series of functions and processes, technical design begins. In technical design the program coding specifications are described through the Rule 3, Component 4 and Window 5 Entities.

Figure 7:
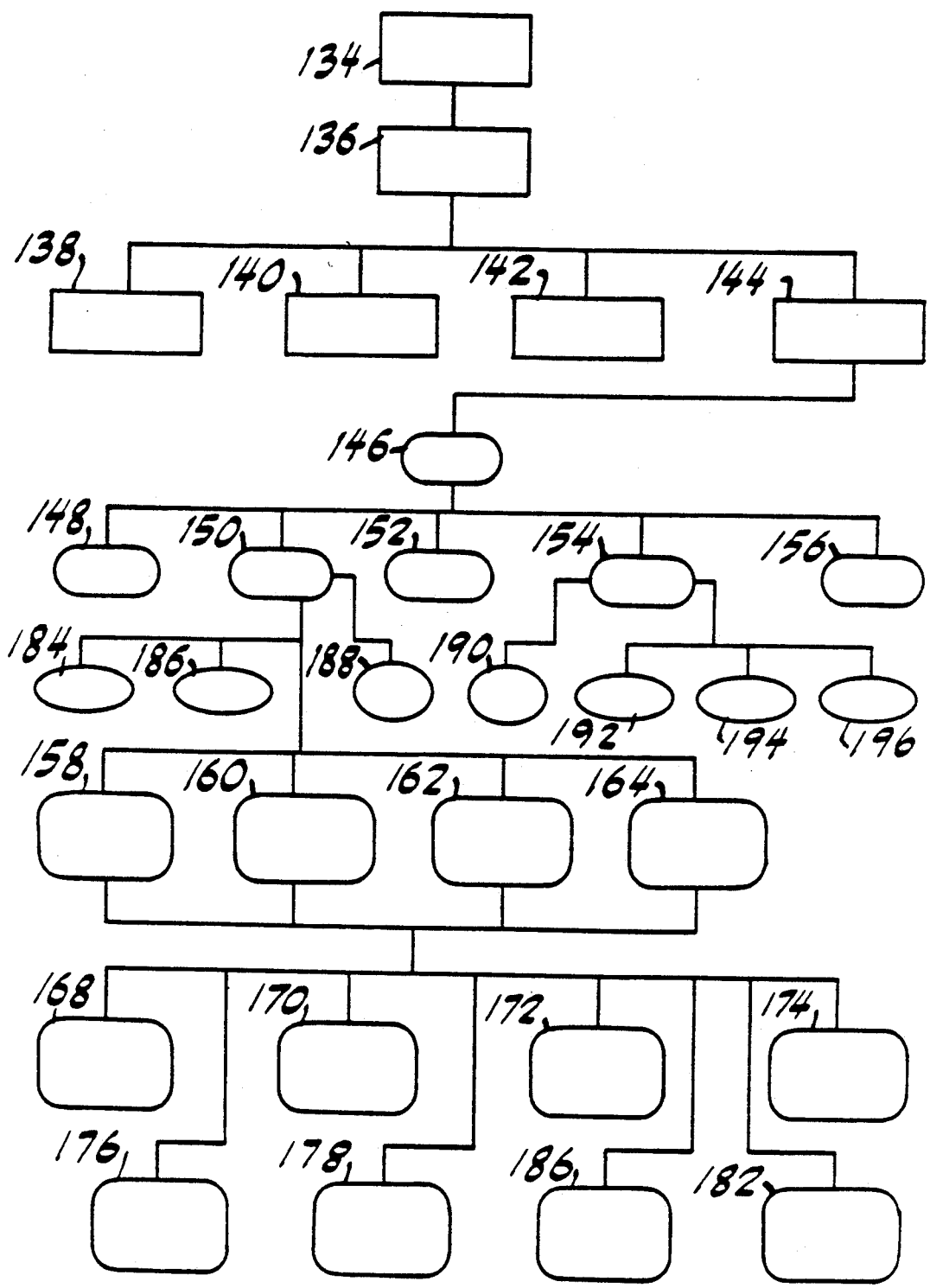
FIG. 7 is a diagrammatic representation of the Process Flow for a sample program using entity-relationship modeling techniques according to the presented invention.
Figure 1:
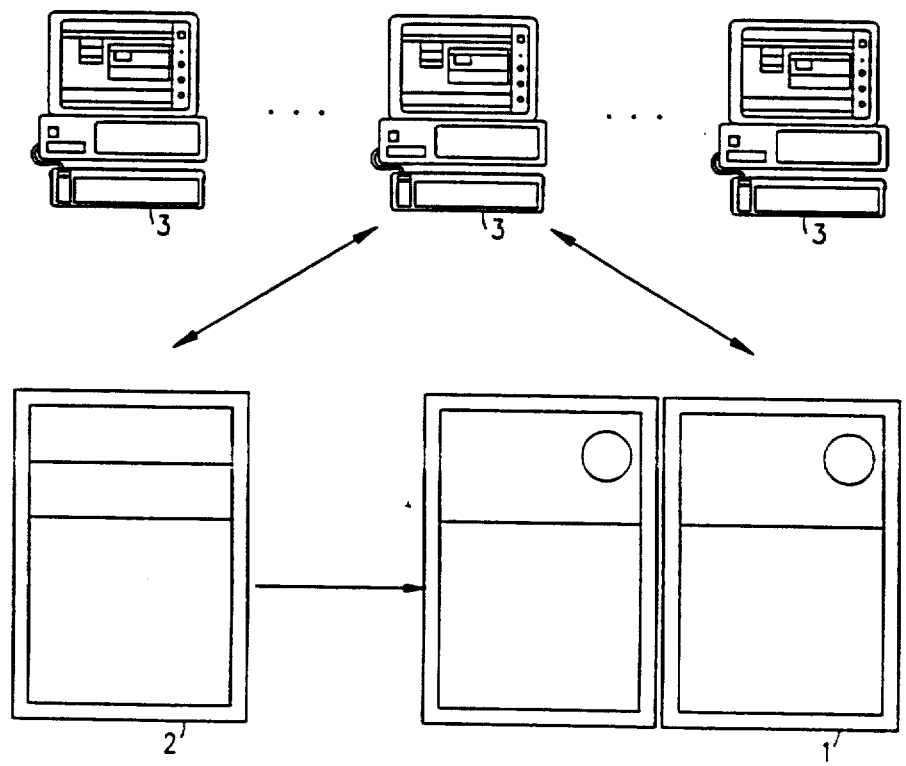
Figure 2:
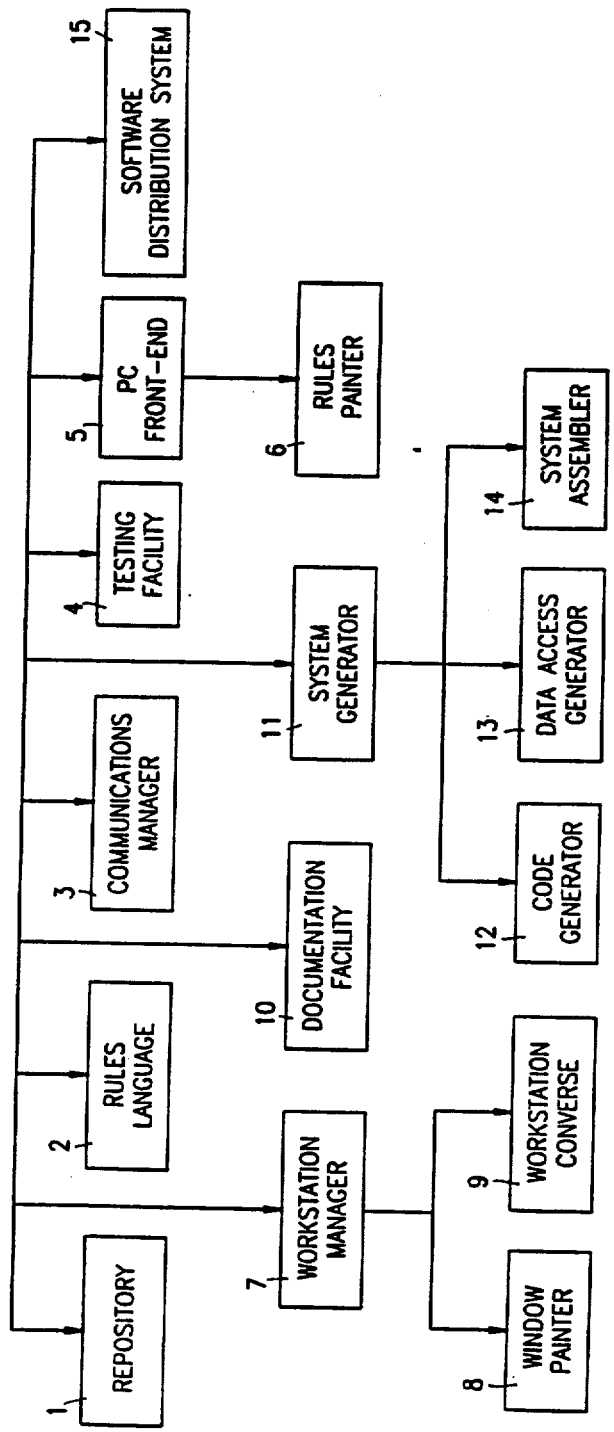
Figure 3:
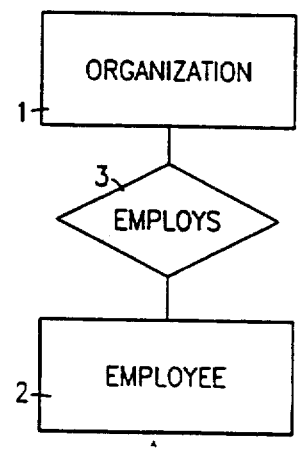
Figure 4:
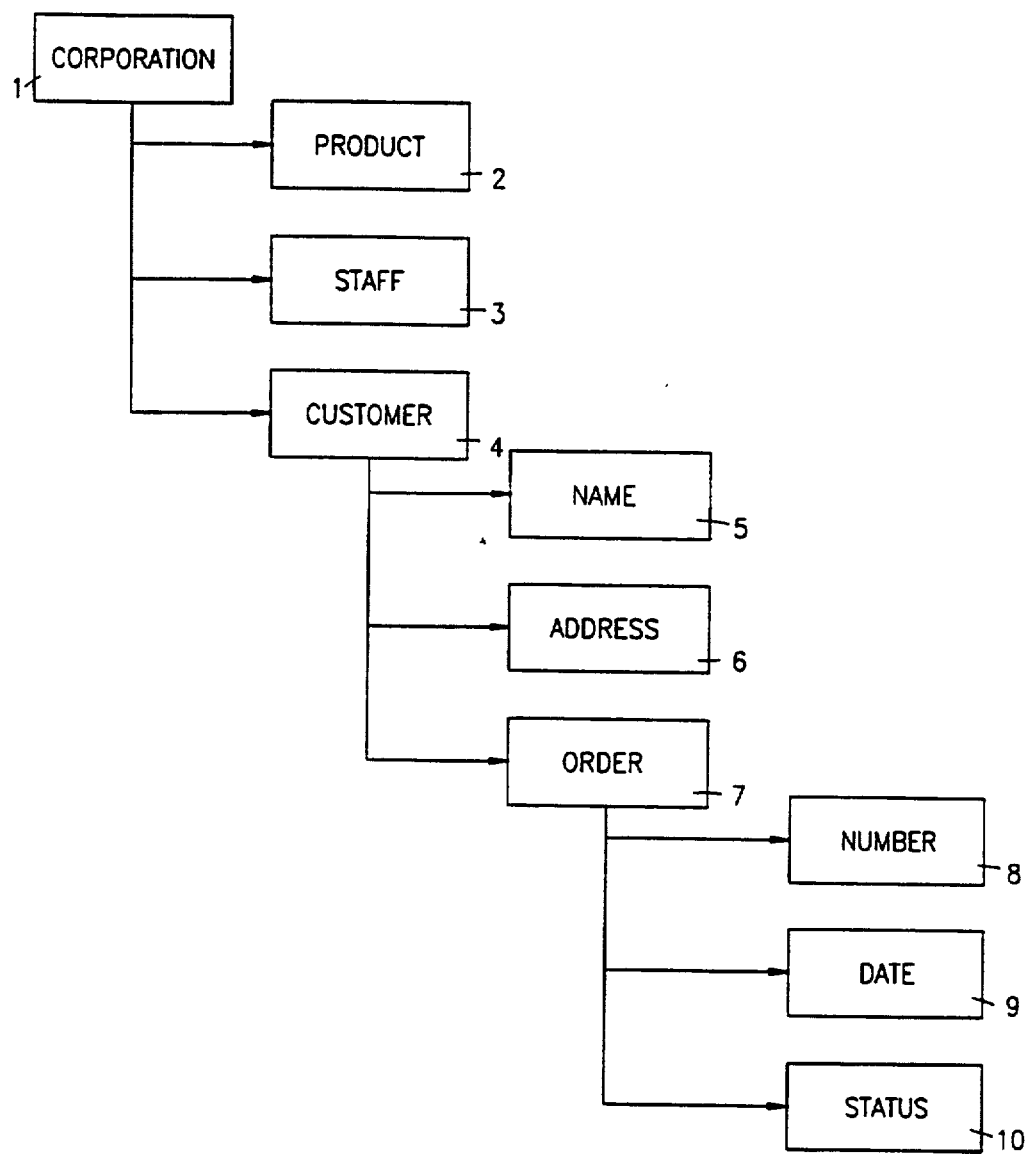
Figure 5:
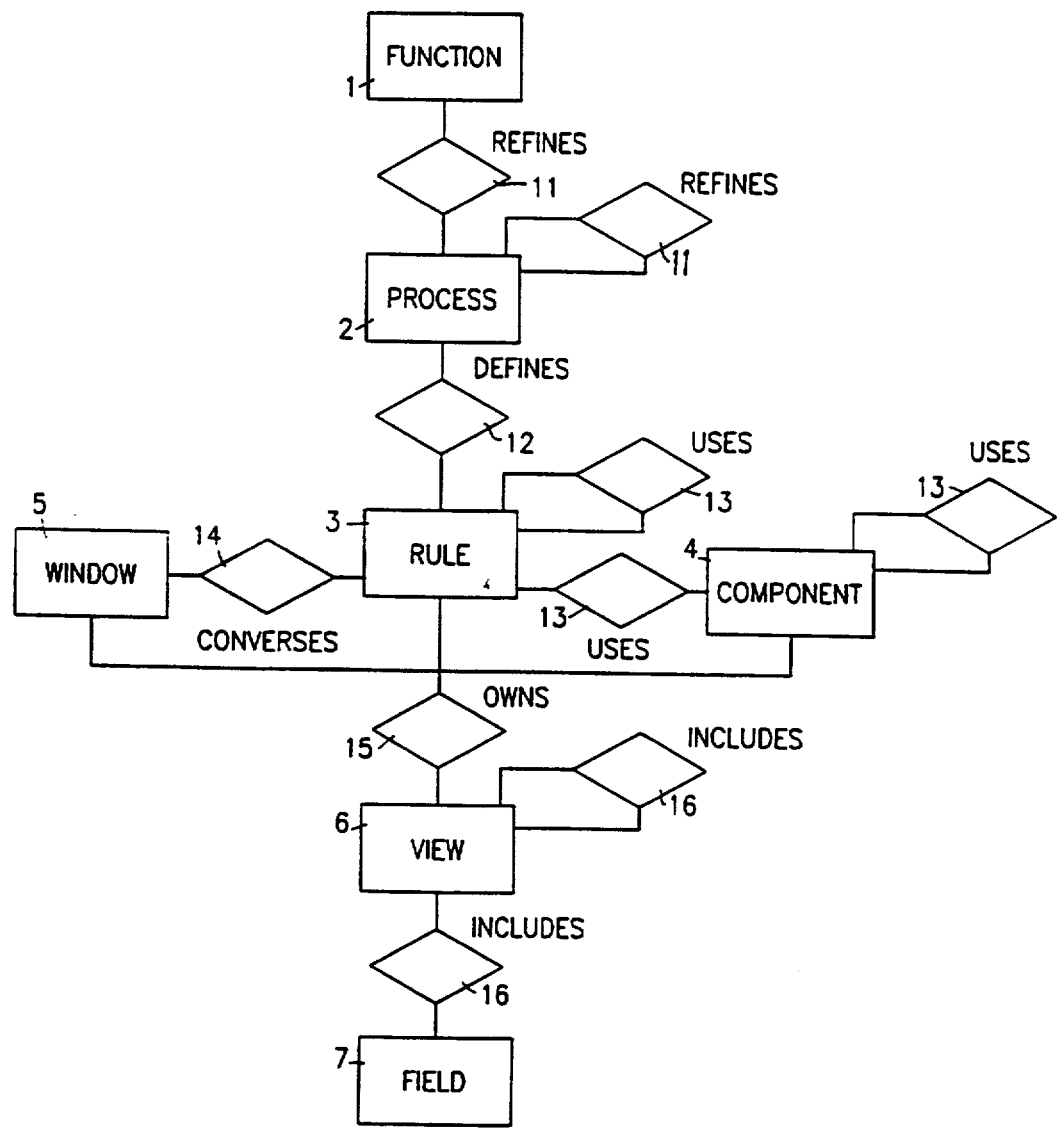
Figure 6:
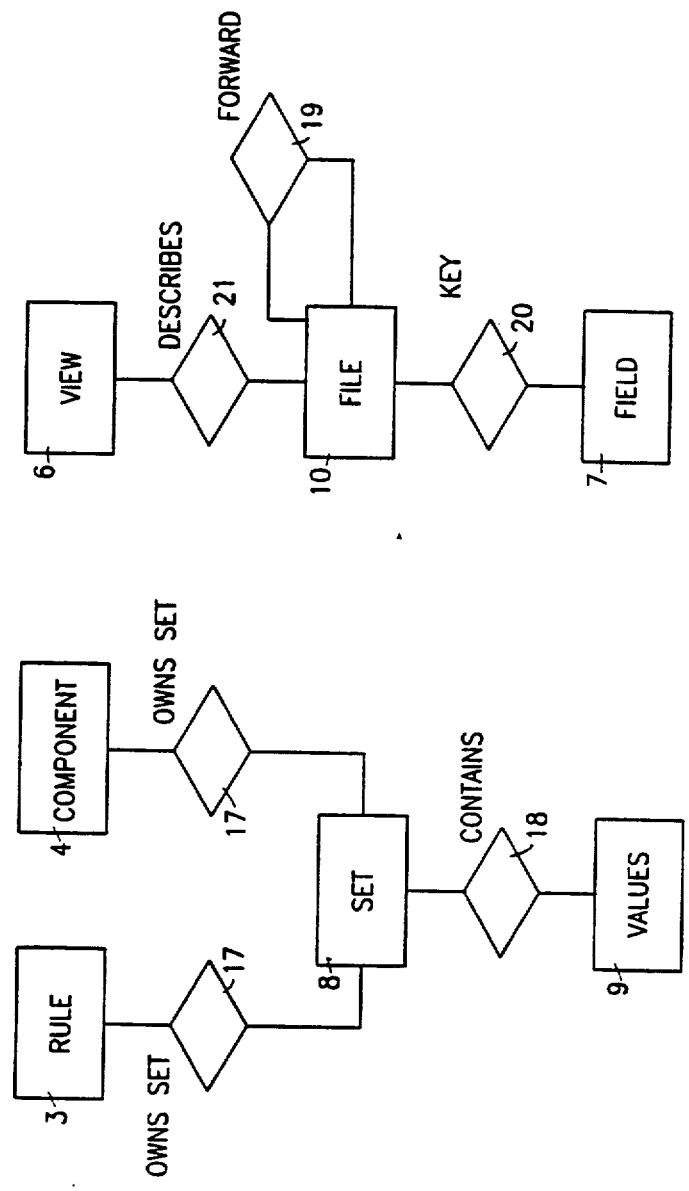
Figure 7A:
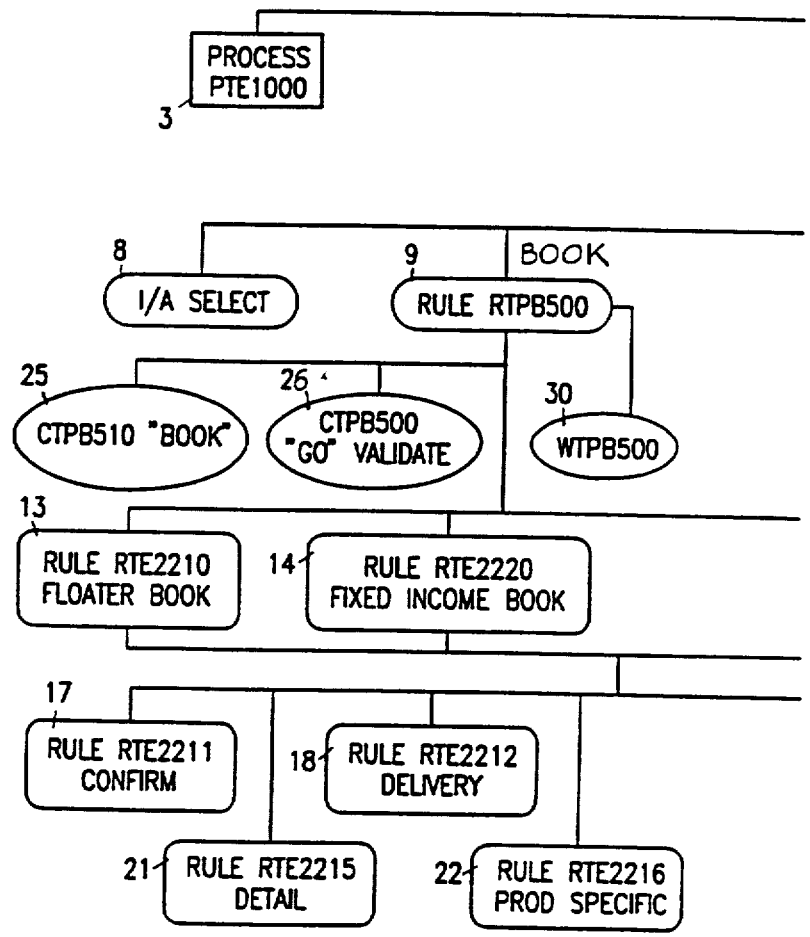
Figure 7B:
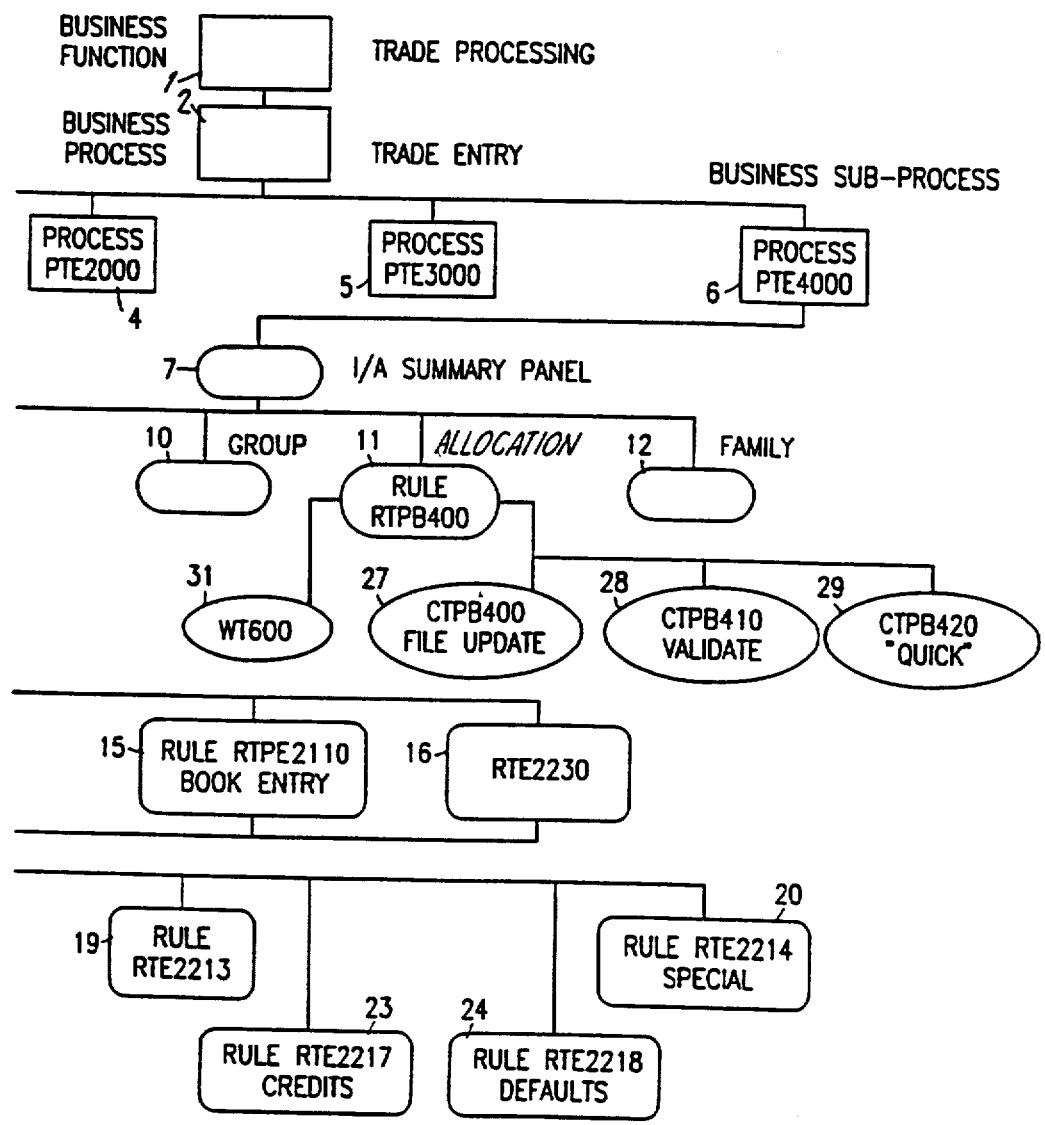

The important aspect of Technical Design is the specification of the Rules and Components, Windows, and Views that are necessary to run the program. FIG. 7 is an example of Process flow diagram using entity-relationship modeling standards. The Square boxes in the FIGS., 1, 2, 3, 4, 5, 6, represent Process and Function Entities. The capsule-shaped boxes, 7-24, represent Rules. The oval-shaped boxes, 25-29, represent Components. The circles, 30, 31, represent Windows. The process flow diagram is used to specify the information contained in the Rule 3, Component 4, Window 5 and View 6 Entities (see FIG. 5) as well as the Relationships between them.

F. Constructing the Program

With the Entity-relationship model in place program construction can begin. Code is generated from the Rules, Components, Windows, Files, Fields, Views, Values and Sets that are stored in the Repository. Rules, Components, Windows and Files are Program Modules distinct from the Rule Entities 3, Component Entities 4, Window Entities 5 and File Entities 10 stored in the entity-relationship model (see FIGS. 5 and 6). Those Entities store information about the actual program modules from which the application program is created.

At this stage of construction much of the work in constructing the program modules is done. The data structures are defined by the View 6, Field 7, Set 8, and Value 9 Entities. The Code Generator Facility 12, FIG. 2, copies these entities into the program modules that are related to them by the Rule 3 and Component 4 Entities (see FIG. 5). Component Modules do not need to be built by the programmer. As they are previously programmed subroutines provided by the CASE facility to perform basic mathematical operations and operating system access. However, the CASE facility permits new components to be stored in the Repository 1, FIG. 2.

The tasks left to the programmer are to (1) define the logic of the program using the high-level Rules programming language; and (2) design the user interface Windows.

1. Re-Usability Analysis

Even before the Rule specification begins, the CASE facility speeds program development because it provides a method to re-use previously generated code. With entity-relationship modeling much of the same logic from one application can be re-used in other applications. It is easier to re-use code that has already been developed and tested than to re-create it. Keeping this in mind, a re-use analysis should be performed.

With the entity-relationship model stored in the Repository 1, FIG. 2, the Entities can be queried for usage by other Entities. For example, with the Repository existing on a database supported by IBM DB2, a Where Used query on the Field Entity 7, FIG. 5, returns a list of all the View Entities 6 using that Field 7. The usage of the Views can be queried further to establish what Rules, Components or Windows use those Views. This method allows programmers to discover previously coded Rules and Components. A Find Where query will search all entity attributes throughout the entire database for particular words or character strings.

In addition the CASE facility allows programmers to define a keyword for all Rules, Components and Field created. A Search command can be performed to locate entities possessing a certain keyword. A programmer can perform sophisticated searches such as find all keywords starting with, for example, "CU" and ending with "Pp".

Once a programmer has located a module that may be re-usable, he or she can get further information by browsing the description or other attributes associated with the entity.

2. The Rules Language

The Rules Language is a high-level programming language which supports all standard flow of control constructs. What is unusual about the Rules Language is that it does not require a means of describing elaborate data structures. The description of all the data structures used by a program within the CASE facility is stored in the View and Set Entities in the program's entity-relationship model. All Rules used by a program share data structures. The sharing of data structures provides strict coordination between the data passed from one Rules Language Module to another. This technique avoids one of the major sources of program errors—a mismatch between the data passed between subroutines. A Rule consists of zero or more declare statements followed by zero or more executable statements. A data type declared must be one of the following type: Smallint, Integer, Char, Varchar, Decimal, Signed Picture or Like (an already declared Item). The declare statement is in the form:

DCL
   declaration; [declaration; . . . ]
ENDDCL
where the declaration is:
identifier [(s) ] [, identifier [(s) ], . . . ] declare type or
   EXTERN identifier [, identifier, . . . ] SET
The data types are more fully explained in Appendix C attached The Rules language supports three types of executable statements: 1) Assignment statements; 2) External flow of control statements; and 3) Internal flow of control statements:

| Assignment Statements | External Flow of Control Statements | Internal Flow of Control Statements |
|---|---|---|
| MAP | USE | IF |
| OVERLAY | RETURN | CASEOF |
| CLEAR | CONVERSE | DO |
|  | ASYNC |  |

Assignment statements alter the data contained in held by program variables. The MAP Statement places an expressed value in a variable location. The OVERLAY statement replaces the contents of a variable with specified data item. The CLEAR Statement replaces numeric fields with zero values and character fields with space values. The syntax of the assignment statements is:
MAP expression TO variable
OVERLAY data item TO variable
CLEAR variable Four statements in the Rules Language handle the external flow of control between program modules.

The USE statement enables one program module to invoke another Rule or Component. It is similar to a subroutine CALL statement in other programming languages. The syntax is:
USE MODULE Component
USE RULE Rule [NEST ]
The Next option indicates that all Windows invoking the Rule will come in "pop up" mode; i.e., it will be displayed over the screen that was previously displayed.

The RETURN Statement transfers control back to the Rule that executed the USE statement:
RETURN.

The CONVERSE statement provides communication between PC-based rules and the user interface. A typical converse statement is:
CONVERSE WINDOW window The Rules Language supports Asychronous data flow with the ASYNC statement. For example, in a system using a Stratus mini computer performing in parallel, unsolicited data allows a Stratus-based Rule to send data to a PC-based Rule. This is supported using the following statements:

| ~ ASYNC | ATTACH |
| ~ ASYNC | DETACH |
| ~ ASYNC | REFRESH |
| ~ ASYNC | ROUTE |

The ASYNC ATTACH command will initiate the receiving of unsolicited input as for example by a PC-based Rule sent by a Stratus-based Rule. The ASYNC DETACH command performs the exact reverse of ATTACH. It may only be used after an ATTACH command, at which point it will discontinue the receiving of unsolicited input. The ASYNC ROUTE command switches data refreshing from one PC Rule to another. The ASYNC REFRESH statement will induce automatic updating of a specific field, so long as the Attach Statement has been used.

The Rules language has three different statements to order the flow of control within a Rule.

An IF statement controls execution based on a specified condition:

| IF condition | [executable stmt . . . ] |
| [ ELSE | [executable stmt . . . ] ] |
| ENDIF | |

The CASEOF statement selects one of several alternative execution paths based on the value of a variable. The syntax is

```
CASEOF variable
CASE constant [constant . . . ] [executable stmt
. . . ]
[CASE constant [constant . . . ] [executable
stmt . . . ]
[CASE OTHER
ENDCASE
```

A DO statement controls the execution of repetitive loops. The syntax is

```
DO [FROM data item] [TO data item] [BY data
item] [INDEX variable] [executable stmt . . . ]
```

```
[WHILE condition [executable stmt . . . ] ]
ENDDO
```

All data items and variables specified to execute a DO loop must be integer numbers. The defaults for the DO statement are: FROM=1, TO=n, BY=1, where n is an integer.

Conditions occur within the IF, CASEOF, and DO statements. A simple condition is:

| expression logical operator expression |
| or  expression INSET Set | where logical operator is one of the following:

| = | <= |
| <> | > |
| < | >= |

A condition is built from simple conditions or other conditions:

|    | simple condition |
| or | (condition) |
| or | NOT condition |
| or | condition AND condition |
| or | condition OR condition |

The INSET statement is used to determine whether a given variable or constant appears as a value within a SET. For example suppose X is a data item whose data type is compatible to the data type of the set:

| X | INSET | SET NAME | is a condition which evaluates to either TRUE or FALSE depending on whether or not at least one of the values, in SET NAME matches the value of X.

A programmer uses the Rules Language statements to write out the logic of the program. For further information on the Rules Language, reference should be made to Appendices A-F attached hereto.

3. User Interface Windows

The user interface for any application is constructed using the CASE facilities Window Painter 8, FIG. 2. The Window Painter is a program which is designed to help build user interface with the aid of a commercially available graphics display program. For example, the Window Painter 8 can be built to run using Microsoft Windows. The Window Painter 8 would then feature the mouse-based Windows interface that is standard to Microsoft Windows. The screens produced with the Panel Builder would also resemble Microsoft Windows interface to the user.

The Window Painter 8 is used to create screen mappings of data designated in the Field 7 and View Entitles 6 (see FIG. 5). The Window Painter 8, FIG. 2, creates a file, (for example, using Microsoft Windows it is called a .vu file). That file contains data to create a screen mapping of the Window View. After creating and saving the panel, the CASE facility of the invention also generates other files, for example, a .PNL and a .MNU files using Microsoft Windows. The PNL file contains the code for the "painted" panel. The .MNU file contains the code for menu structures used by a panel. (See references cited, supra.)

G. Code Generation

Once an application has been modeled, and the Rules, Components and Windows have been created, the CASE facility produces source code.

Preparation is the code generation phase. When an application is prepared, the Views 6 and Sets 8, FIG. 5, are used to create copybooks. A copybook is a file which is copied into the source code of a program module. The CASE facility creates a copybook for each data structure and includes a copy of that file in every executable Rule, Window or Component related to a particular View or Set.

Preparation also generates environment-specific source code for each Rule Language module. The Rule Entity 3, FIG. 5, contains an attribute specifying the environment destination of each Rule Module. The Code Generator, 12, FIG. 2, takes high-level Rules Language statements and translates them into source code in a language supported by the hardware environment of the Rule's destination. For example, if a Rule was to be executed on a Personal Computer that supported only the C language, the Code generator would translate the Rule Language Statements in C.

If the Rule Language statements specified in a module can be successfully generated into source code the code is stored in files in the Repository. However, if there are logical errors in the Rule Language statements, no code is saved and error messages detailing the unsuccessful result are saved in a Failed Results File.

Once preparation has been performed, detailed reports can be made for each Entity in the entity-relationship model. Those reports are a program's technical documentation.

H. Distribution

When the modules of an application have been successfully prepared, they are ready to be transported to their target environments. The capability is provided by the Software Distribution System 15, as shown in FIG. 2. (See U.S. application incorporated by reference, supra.)

1. Assembly

When all the source code modules of an application have been distributed, they must be assembled into a running computer program. The steps are to: 1) Compile the source code; 2) Enable communication routines to allow interaction of program modules across environments; and 3) Bind or link the compiled code.

Assembly must be executed in each environment where program modules were distributed. For example, on a system incorporating PC processing, the PC will have a PC-based System Assembler 14, FIG. 2, that will enable a programmer to compile and bind the PC-based rules.

In the same example, separate assembly would have to be completed on a mini computer. For example on a IBM S/88 or Stratus mini computer, a command "Build the Rule Router Application" takes Frontier Rules and links them to every other Rule source code module existing in the mini-environment. The function also binds the code into an executable module.

Mainframe program modules also must be separately assembled. For example, in an IBM environment supported by CICS and DB2, a mainframe-based System Assembler 14, FIG. 2, provides assembly functions for the Rule and Component source code. For a Rule, an assembler would:
  verify that the Rule is a valid mainframe rule;
  verify that the Rule has completed the code generation process;
  prompt the user to indicate if the Rule is to be setup as a Frontier Rule;
  read the Bind file to load the on-line VSAM Views File and the on-line VSAM Relationship File for runtime PCI and Conversion use;
  load the source code to the online VSAM Source file for rule View use;
  automatically perform the DB2 Bind based upon the relationships defined to the Repository for Frontier Rules that use Components which issue DB2 calls;
  display a list of other Rules and Components affected by the setup of a particular Rule;
  assign a unique CICS TRANSID and a unique DB2 Plan name for Frontier Rules that use Components which issue DB2 calls;
  Rebind a DB2 Plan for a Frontier Rule when one of the Rule's related Components, that issue DB2 calls, has been modified;
  remove the rule from the CICS environment when the Rule is no longer needed;

A Component assembler in a CICS environment would perform these functions:
  provide the facilities for a programmer to compile his Component in a language supported by the system such as with options for CICS INTERTEST and DB2;
  allow the programmer to view the results of his compile (compile listing and link edit map);
  display a list of other Rules and Components affected by the setup of a particular Component;
  allow the user to edit the source code of a mainframe Component;

J. Execution

Upon successful assembly of the application modules in each hardware environment the program can now be executed and tested. The CASE facility provides the ability to execute and test the application from any environment in the hardware architecture. For example, using the hardware architecture comprised of an IBM Mainframe, an IBM Stratus mini computer and PC workstation, as in FIG. 1, a programmer seated at a PC would have the option to:
  Execute the PC based portion of an application; no links will be created with modules executing in Stratus or Mainframe other environment;
  Test the modules and modular executing in one other environment. In this case links are created with utilities other environments. This permits communication between environments;
  Execute or test the entire program. In this case links are created with each of the required execution environments.

K. Revising an Application

The process of changing the elements in an application using the Entity/Relationship Modeling system and the Rules Language is a straightforward process. The database is entered and the program element is changed. However, small changes in this system can have large consequences. In general any entity type that Owns, Uses, or Includes Entities that have been changed will have to be reprepared or "Modified". The CASE facility accomplishes the modification through the Software Distribution System 15, FIG. 2. (See U.S. application incorporated by reference, supra.)

L. Testing Facility

Finally, the CASE system provides debugging and testing facility that enables users to evaluate the performance of a application.

Generally the applications are first inputed on the computer at code level. Traditional code debugging tools are designed for testing at the code level only. Instead, the CASE facility presented by this invention provides a high-level debugging tool called Rule View which is part of the Testing Facility 4 depicted in FIG. 1. A version of Rule View would exist in each of the operating environments in a hardware configuration. Applications spanning more than one environment require a separate testing for the modules in each environment.

Calls to Rule View are automatically embedded by the CASE facility when code is generated. Rule View runs the application in a Rules-level debugger locating errors and problems that occur. It can be used interactively to step through a Rules process and examine the contents a View Copybook at any point. Rule View gives programmers the ability to:

1. Initiate the execution of a Rule.
2. Break the interface between a Rule and a Second Rule or Component.
3. Step into the logic of a Rule.
4. Step over Rule or Component Module.
5. Step back to the beginning of a Module.
6. Examine and modify any Field within a View owned by the active Rule.
7. Review the active Rule's source code.
8. Save any View data for future reference and re-use.
9. Print the Rule source code and View data.

Rule View will assemble at each breakpoint, a list of Views that can be examined and edited. The number of Views displayed depends on where and how Rule View is used. In most cases, the Views available for display will contain the input, output of the Rule being executed. In more advanced situations—where asynchronous Rules are being debugged or multiple applications are being tested—many Views may be available for examination. The contents of a View can be printed or saved in a file.

The Rule View editor permits the programmer to edit any data by using a Field Editor. With the Field Editor, a programmer can change any data by typing over the old information. The editor also permits the user to restore the contents of any field to its original value.

To review a Rule's source code, a Text Editor provides an option where the line of source code currently being executed is highlighted at all times. If multiple modules are running under Rule View, the source that is displayed will be the source code that Owns the data in the current View.

APPENDIX A: RULES LANGUAGE SYNTAX

Tokens of the Rules Language

Tokens are the atoms from which a programming language is built. All reserved words such as IF, AND, FROM, ... represent tokens of the Rules Language. Other examples are special symbols such as ")" (right parenthesis), "<=" (less or equal relational operator), and the like. Finally you will also encounter tokens such as DICT_view (View Name) which denote references stemming from the Repository.

Reserved Words

| | | |
|---|---|---|
| ABS | EVERY | OVERLAY |
| ALL | EXISTS | PC |
| AND | EXP, EXP 10 | PREV |
| ASCENDING | EXTERN | PUT |
| ASYNCH | EXTRACT | QUEUE |
| ATTACH | FALSE | REFRESH |
| AVG | FIELD | RETRIEVE |
| BEEP | FLASH | RETURN |
| BY | FORALL | RIGHTJ |
| CASE | FROM | ROUND |
| CHAR | IF | ROUTE |
| CICS | IN | RULE |
| CLEAR | INDEX | SET |
| COMPONENT | INSET | SETERROR |
| CONVERSE | INTEGER | SMALLINT |

| | | |
|---|---|---|
| CURRENT | LEFTJ | SPACES |
| DCL | LENGTH | SQL |
| DELETE | LIKE | SQRT |
| DEPENDING | LOG, LOG10 | STRATUS |
| DESCENDING | MAP | STRING |
| DETACH | MAX | SUBSTRING |
| DIV | MIN | SUM |
| DO | MOD | TO |
| DOMAIN | MODULE | TRIM |
| ELSE | MOVE | TRUE |
| EMPTY | NEST | TYPE |
| ENDCASE | NEXT | USE |
| ENDDCL | NOT | VIA |
| ENDDO | NUMERIC | VIEW |
| ENDEXTERN | OCCUR | WHILE |
| ENDFORALL | OF | WINDOW |
| ENDIF | ON | ZERO |
| ENDSET | OR | ZEROES |

Reserved Symbols

| Characters | Description | Symbol |
|---|---|---|
| *> | Left comment | - |
| <* | Right comment | - |
| ( | Left parenthesis | LP |
| ) | Right parenthesis | RP |
| = | Equal | EQ |
| >= | Greater or equal | GE |
| > | Greater than | GT |
| <= | Less than or equal | LE |
| < | Less than | LT |
| <> | Not equal | NE |
| , | Comma | COMMA |
| ; | Semicolon | SEMI |

Repository Entity Identifiers

MODULE_NAME
RULE_NAME
WINDOW_NAME
VIEW_NAME
SYMBOL_NAME
SET_NAME

PRECEDENCE TABLE

The following precedence table lists the precedence or binding power of the Rules Language operators in increasing order. Operators which occur on the same line have amongst themselves the same binding power.

| | |
|---|---|
| OR | left to right |
| AND | left to right |
| NOT | right to left |
| EQ NE LE LT GE GT | non-associative |
| INSET | non-associative |
| MINUS | left to right |
| IN | non-associative |
| OF | right to left |

The right column describes the associativity of the operations. We can see from the "AND line' of the precedence table that it is perfectly legal to write for conditions cond1, cond2, cond3 cond1   AND   cond2   OR   cond3 and that implied order or parsing is first cond1   AND   cond2 and afterwards cond2   AND   cond3

Another example: Given a partial qualification

V1   OF   V2   OF   V3 involving three Views V1, V2, V3 then the parser first recognizes

V2   OF   V3 and afterwards

V1   OF   V2.

APPENDIX B: RULES LANGUAGE GRAMMAR (BNF)

```
rule_code:        dcl_s_list   stmt_list dcl_s-list:       empty
          |       dcl_s_list   dcl_stmt dcl_stmt:         DCL  dcl_1st  ENDDCL dcl_1st:          dcl_item
          |       dcl_1st   dcl_item dcl_item:         dcl_idx_item
          |       dcl_chr_item
          |       dcl_int_item
          |       dcl_like_item
          |       dcl_ext_item dcl_idx-item:     dclvar_list   INDEX SEMI dcl_chr_item:     dclvar_list chrtype SEMI dcl_int_item:     dclvar_list inttype SEMI dcl_like_item:    dclvar_list liketype SEMI dcl_ext_item:     extern dclvar_list decttype SEMI dclvar_list:      dclvar_item
          |       dclvar_list   COMMA   dclvar_item dclvar_item:      simple_var
          |       simple_var   dcl_subscr
```

```
view_clause:        (empty)
            |       VIEW data_item field_clause:       (empty) clause
            |       FIELD data_item occur_clause:       (empty)
            |       OCCUR data_item beep-clause:        (empty)
            |       BEEP flash_clause:       (empty)
            |       FLASH cond_stmt:          if_stmt
            |       case_of-stmt
            ;

if-stmt:            IF cond stmt-list ENDII
            |       IF cond stmt_list  ELSE stmt_list ENDIF case_of_stmt:       CASE_OF caseof_var case_list   ENDCASE
            |       CASE_OF caseof_var case_list   CASE OTHER
                    stmt_list ENDCASE caseof_var:         variable case_list:          single_case
            |       case_list single_case single_case:        CASE case_lit_list  stmt_list case_lit_list:      lit
                    set_const
                    MINUS int_lit
                    MINUS dec_lit
                    case_lit_list lit
                    case_lit_list  set_const do_stmt:            DO stmt_list  WHILE cond stmt_list ENDDO
            |       DO stmt_list ENDDO do_idx_stmt:        DO do_clauses stmt_list while_clause ENDDO do_clauses:         from_clause to_clause by_clause
                    index_clause from_clause:        (empty)
            |       FROM expr to-clause:
            |       TO expr by_clause:
            |       BY expr index_clause:
            |       INDEX variable
```

```
chrtype:            CHAR
                  | CHAR dcl_subscr inttype:            SMALLINT
                  | INTEGER liketype:           LIKE simple_var dcl_subscr:         LP  int_lit  RP dicttype:           SET stmt_list:          (empty)
                  | stmt_list  stmt stmt:               assign_stmt
                    overlay-stmt
                    clear_stmt
                    use_stmt
                    return_stmt
                    converse_stmt
                    async_stmt
                    cond_stmt
                    do_stmt
                    do_idx_stmt assign_stmt:        MAP expr TO variable overlay_stmt:       OVERLAY dat_item TO variable clear_stmt:         CLEAR variable use_stmt:           USE MODULE MODULE_NAME
                  | USE RULE RULE_NAME nest_clause nest_clause:        (empty)
                  | NEST return_stmt:        RETURN converse_stmt:      CONVERSE window_clause window_clause:      WINDOW WINDOW_NAME async_stmt:         ASYNC attach_detach RULE_NAME VIA RULE
                    RULE_NAME
                  | ASYNC ROUTE RULE RULE_NAME TO RULE
                    RULE_NAME
                  | ASYNC refresh_stmt attach_detach:      ATTACH
                  | DETACH refresh_stmt        REFRESH window_clause
                    field_clause
                    view_clause
                    occur_clause
                    beep_clause
                    flash_clause
```

```
while_clause:
            |           WHILE cond stmt_list cond:                   simple_cond
            |           LP cond RP
            |           not cond %prec NOT
            |           cond AND cond %prec AND
            |           cond OR cond %prec OR simple_cond:            expr  rel_op   expr
            |           expr     INSET SET_NAME rel_op:                 EQ
            |           NE
            |           num_rel_op num_rel_op:             LT
            |           LE
            |           GT
            |           GE variable:               simple-var
            |           qual-id qual_var_list
            |           simple_var subscr_unit
            |           qual_id qual_var_list subscr_unit subscr_unit:            LP item_list RP item_list:              expr
            |           expr COMMA expr
            |           expr COMMA expr COMMA expr qual_var_list:          OF VIEW_NAME
            |           qual_var_list OF VIEW_NAME dat_item:               variable
            |           lit
            |           set_const set_const:              SYMBOL_NAME
            |           SYMBOL_NAME IN SET_NAME lit:                    char_lit
            |           int_lit
            |           dec_lit
```

APPENDIX C: RULES LANGUAGE SEMANTICS

Identifiers

Identifiers are used to name certain Language constructs, such as variables (for example, Fields and Views) and other Repository entities such as Rules and Components.

A Field identifier must begin with an alphabetic charter. It is optionally followed by a sequence of one or more letters, digits, or underscores. No distinction is made between lower and upper case; therefore a_long_identifier and A_LONG_IDENTIFIER name the same thing as far as the Rules Language is concerned. An identifier may not contain any embedded "white space" (blanks or tabs or new lines).

You may use names for identifiers which are reserved words within the Cobol or C (or any other Language (such as SENTENCE OR SIZE). Note, however, that certain words have been reserved as keywords and for possible future extensions of the Rules Language (see Appendix A). Also, identifiers have restrictions upon their length, depending on what they name. These restrictions are listed in Figure 1.

| Identifier Type | Maximum Number of Characters |
|---|---|
| Field | 18 |
| View | 8 |
| Symbol | 18 |
| Set | 8 |
| Window | 8 |
| Rule | 7 |
| Component | 7 |

Figure 1 Identifier Length Restrictions

Appendix A contains a list of "reserved words" for the Rules Language. These identifiers may not be used to name any other Languages construct, such as Fields, Views, Rules, Components, etc.

Operators and Delimiters

The following characters have special significance to the Rules Language and are used as binary and unary operators.

| Symbol | Name | Function |
|---|---|---|
| ( | Left parenthesis | Grouping; subscripts |
| ) | Right parenthesis | |
| = | Equal symbol | To form symbols for relational operators |
| < | Less than symbol | |
| > | Greater than symbol | |
| <> | Not equal symbol | Test for inequality |
| <= | Less than or equal to symbol | Test for less than or equal to |
| >= | Greater than or equal to symbol | Test for greater than or equal to |

| | | |
|---|---|---|
| - | Minus symbol | Negation |
| , | Comma | Separation of list element and subscripts |
| ; | Semicolon | Termination of declartion of local fields |
| + | Addition | For future use |
| * | Multiplication | "      "      " |
| / | Division | "      "      " |
| ++ | Union | "      "      " |
| ** | Intersection | "      "      " |
| -- | Set difference | "      "      " |
| << | Sub-Set | "      "      " |
| >> | SuperSet | "      "      " |

Figure 2   Binay and Unary Rules Language Operators

Comments

Comments are enclosed between "*<" and "*>" as delimiters. Comments cannot be nested. There is no limit to the length of a comment.

```
*> This is an example of a comment <*
*> This is <* *>another example <**> of a comment <*

*>

*  It is
*  prefection OK to
*  spread a comment
*  over more than
*  one line
*  and use * or < on their own
<*
```

Input past column 72 is treated as a comment (i.e., ignored).

Data Items

Data items are the variable and constants of the Rules Language. Fugure 6-5 shows how these items are related to one another.

Data Item
> Variable
>> Field
>> View
>
> Constant
>> Literal
>>> Character Literal
>>> Numeric Literal
>> Set Symbol

Figure 3  Data Item Hierarchy Table

Variables

Variables are defined using the View and Field HPS entities.
Fields and Views are defined and described outside of the
Language itself using the facilities of the Repository.
Note that, with certain restrictions, Fields and Views can be
declared local to Rule Block by means of the DCL construct!

Fields

A Field is a variable which behaves like an atom; that is, it
<u>cannot</u> be divided into smaller units.  With the exception of a
limited facility for declaring fields local to a Rule program,
Fields are defined using the facilities of the HPS Repository.
They are <u>not</u> defined within a Rule.  Some examples of Fields and
their types follow.

FLD_1                SMALLINT

WORD_COUNT       INTEGER

In the example given above, FLD_1 is a two byte (signed) integer
variable and WORD_COUNT is a four byte (signed) integer
variable.

FLD_2                CHAR

CUSIP_ DESCR      CHAR   (20)

FLD_2 and CUSIP_DESCR are character Fields of lengths 1 and 20,
respectively.

CUST_BAL_AMT      DECIML (15, 2)

CUST_BAL_AMT is a "Dollars and Cents" variable with up to 15
digits precision, two of which are to the right side of an
implied decimal point.  DECIMAL (p,q) Fields are signed
quantities.

CASH_TXN_BAL_AMT   PIC S9999V99

CASH_TXN_BAL_AMT and CASH_TXN_CR_AMT are both numeric variables with up to 4+2 = 6 digits precision, two of which are to the right side of an implied (V="virtual") decimal point. The S in the first example denotes an optional sign whereas in the declaration:

```
CASH-TXN_CR_AMT      PIC 9999V99
```

CASH_TXN_CR_AMT cannot be negative.

```
TEMP_BUFFER          VARCHAR   (50)
```

The constructs of the Rules Language do not distinguish TEMP_BUFFER from a CHAR (50) variable. Both CHAR (50) and VARCHAR (50) allocate 50 bytes of storage and in both cases anything that is moved into either of them will be left justified and padded to the right with spaces. A VARCHAR (n) variable keeps track of its "actual" length through the use of a separate length Field which is completely transparent to the Rules Language programmer.

The following table summaries the Field types which are supported within the HPS Rules Language and some of their properties:

| Type | Representation (1) | Char/Num | Note |
|---|---|---|---|
| Character | CHAR(nn) | Character | (2) |
| VarChar | VARCHAR (nn) | Character | (3) |
| 2-Byte Integer | SMALLINT | Numeric | (4) |
| 4-Byte Integer | INTEGER | Numeric | (4) |
| Decimal | DECIMAL (p,q) | Numeric | (4) |
| Signed Picture | PIC S9999999v9999999 p times q times | Both | (5,6) |

Notes:

(1) "Representation" refers to the format of the DCL ... ENDDCL statement for a variable of that type. Note that the current release of HPS supports local declarations for data types CHARACTER, VARCHAR, and both SMALLINT and INTEGER Variables DECIMAL is not supported. See Section 4 (Field Entity Types) for furthe information on data types.

(2) CHAR is the same as CHAR (1).

(3) VARCHAR is the same as VARCHAR (1).

(4) Integer, Decimal variables re signed variables.

(5) Signed Picture varibles are signed, unsigned Picture variables are unsigned.

(6) Picture variables are of a dual nature. They behave like numeric variables except in the following cases where there behave like CHAR (nn) variables:

- When they are compared to Fields or Constants of the type CHAR or VARCHAR or to Views.

- when they appear as the source of a MAP or OVERLAY statement the target of which is a Field of type Character or VARChar or a View.

Views

Data used by the CASE facility in the presented invention are organized into hierarchical structures. For example, a sub-View is the parent to a Field.

For ease of documentation, Views are represented left-to-right in outline form rather than the graphical top-to-botton method. The top-most (left-most) node is also referred to as the "01-level View" (a COBOL and PL/1 convention).

The following data structure has vw_1 as its 01-level View. vw_1 consists of the child Views CG_VW_11, CG_VW_13, and CG_VW-10, and of the Fields CUSIP_DESCR, CUST_BAL_AMT, and CASH_TXN_BAL_AMT. The sub-child View (also referred to as the child View or child of) CG_VW-13 of VW_1 is built from CG_DATE, SUB_VIEW, CG_BIT. The child SUB_VIEW of CG_VW_13 has the Fields CGVARCHAR and CG_CHAR, but no subordinate Views.

```
VW_1,

CG_VW_11

CG_DATE        CHAR     (08),
        CG_VARCHAR     VARCHAR  (10),
        CG_CHAR        CHAR     (10),
        CG_BIT         CHAR     (01),

CG_VW-13,

CG_DATE        CHAR     (08),
        SUB_VIEW       (05),              *>occurs 5 times<*
           CG_VARCHAR  VARCHAR  (10),
           CG_CHAR     CHAR     (10),
        CG_BIT         CHAR     (01), CUSIP_DESCR         CHAR (20),
   CUST_BAL_AMT        DECIMAL (15,2),
   CASH_TXN_BAL_AMT    PIC S9999V99,

CG-VW-10

SUB_VIEW       (05),              *>occurs 5 times<*
           CG_VARCHAR  VARCHAR  (10),
           CG_CHAR     CHAR (10),
        INT_RATE       DECIMAL  (7,7),
        CG_BIT         CHAR     (01),
```

Figure 5 Data Structure From View

The above View, VW_1, illustrates many of the concepts underlying HPS data structures.

Each of the sub-Views belonging to the above tree structure is itself a tree structure of which it becomes the 01-level View. For example, CG_VW_10 defines a tree with CG_VW_10 as the top node, SUB_VIEW, INT_RATE and CG_BIT as its 2nd level leaves and nodes, and CG_VARCHR AND CG_CHAR as its 3rd level leaves.

A view is uniquely determined within the Repository through the name of its 01-level node. In other words, VW_1 stands for the whole collection of all the Views and Fields in the figure.

Virews and Fields can occur more than once within a true. But they are not allowed to form recursive constructs by referring to themselves, either directly or through a chain of itermediate child or parent Views.

For example, CG_CHAR is a Field and SUB_VIEW is a View each appearing more than once within VW_1.

Note that in accordance with Paragraph 1, SUB_VIEW defines the same tree structure regardless of whether it appears as a child of CG_VW 10 or of CG_VW_13.

```
       SUB_VIEW         (05),
          CG_VARCHAR    VARCHAR    (10),
          CG-CHAR       CHAR       (10),
```

Figure 6    Sub-View Data Structure

The Field CG_CHAR that belongs to the View SUB_VIEW that belongs to the View CG_VW_10 can contain different data from the Field CG_CHAR that belong to SUB_VIEW that belongs to CG_VW-13. In fact, they occupy different storage locations. furthermore, CG_CHAR appears elsewhere--it is also a Component of CG_VW_11. How do you tell these instances apart within a Rules program?

First, write the fully qualified name of the ambiguously determined items (which may be either Fields or Views). The fully qualified name begins with the name of the item at the lowest level (which may be either a Field or a View) and works up to the top of the tree naming each of the Views (not Fields), sparating each of the names with the reserved word OF. (This naming convention is borrowed from COBOL and is different from the one used in C and PL/I. For example, in the case of CG_CHAR we have

```
       CG_CHR OR SUB_VIEW OF CG_VW_11 OF VW_1
       CG_CHAR OF SUB_VIEW OF CG_VW-13 of VW_1, and
       CG_CHAR OF CG_VW_10 OF VW_1
```

Figure 7    Fully Qualified Names

The general notation is as follows:

Let X be a Field or View which has a parent V1 which has aparent V2 ... and so on.

Let Vn denote the top node ...

Then, the fully qualified name of X is:

X of V1 OF V2 ... OF VN.

These fully qualified names are sufficient to discriminate
between the instances of CG_CHAR. In fact, they contain
redundant information for the Rules code generator to
discriminate between instances. To arrive at the necessary and
sufficient information, simply delete the names of the Views
which are common to the fully qualfied names. Of course, do not
delete the name at the base of the upward path to the top level
View. Applying this to the above example results in:

```
        CG_CHAR             OF CG_VW_11
        CG_CHAR             OF CG_VW-13, and
        CG_CHAR             OF CG_VW_10
```

Figure 8    Edited Qualfied Names

This is the minimal information which the Rule code generator
requires to discriminate between the instances of CG_CHAR.
Furthermore, this is also the minimal information your eye would
need to tell the instances apart with a glance at an outline of
VW_1.

There is, however, one type of ambiguity which cannot be
resolved with fully qualified names if partially qualified names
are permitted. Consider the following View structure:

```
    VIEW10
        FIELD 1,        *>first occurrence of FIELD1 <*
        VIEW1,
            FIELD1      *>second occurrence of FIELD1 <*
            FIELD2,     *>first occurrence of FIELD2 <*
        VIEW2,
            FIELD2,     *>first occurrence of FIELD2 <*
```

FIGURE 9     AMBIGUOUS FIELD STRUCTURE

VIEW0 contains FIELD1 as an ambiguous reference because the only
sensible choices for (partially qualified) names for the first
occurrence are either:

```
        FIELD1 or

FIELD1 OF VIEW 10,
``` but both of them also make reference to the second occurrence of
FIELD1. Note in constrast that one can clearly make a
distinction between the contents of:

```
        FIELD2 OF VIEW1, and

FIELD2 OF VIEW2.
```

Subscripts

The Rules Language supports views with subscripts (OCCURS

Attribute of the View-View/HPS relationship). They are the
counterpart of tables in COBOL and arrays in C or PL/1.

Assume that VW-2 is a View defined in the HPS Repository as
follows:

VW_2

```
        CG_VW-11            (8)          *> occurs 8 times <*

CG_DATE         DATE
            CG_VARCHAR      VARCHAR   (10),
            CG_CHAR         CHAR      (10),
            CG_BIT          CHAR      (10),

CG_VW_13            (10),        *> occurs 10 times <*
            CG-DATE    ,    DATE
            CG_SUB_VIEW     (05),        *> occurs 5 times <*
                CG-VARCHAR  VARCHAR   (10),
                CG_CHAR     CHAR      (10),
                CG_BIT      CHAR   .  (01), CG_VW_10
            CG_VARCHAR      VARCHAR   (10),
            CG_CHAR         CHAR      (10),
            CG_BIT          CHAR      (01),
```

Figure 10    Subscripted View

In each occurrence of VW_2 there are 8 instances of CG_VW_11
(and all the Fields subordinate to it), 10 instances of CG_VW_13
(and all the Fields and Views beneath it), and 5 instances of
CG_SUB_VIEW subordinate to each of the 10 instances of CG_VW_13.

Note: An occurrence clause is <u>not</u> a property of a View entity,
but of the relationship (owns) created between one View and
another.

Using the example in Figure 10, CG)_CHAR can be referred to as
follows:

1.   CG_CHR OF CG_SUB_VIEW OF CG_VW_13 OF VW-2     (S1)
2.   CG_CHR OF CG_SUB_VIEW OF CG_VW_13 OF VW-2     (S1, S2)
3.   CG_CHR OF CG_SUB_VIEW OF CG_VW_13 OF VW-2     (S1, S2, S3)

where S1, S2, S3 denote the subscripts of VW-2, CG-VW-13 and
CG_SUB_VIEW respectively. Note that in conventional terms,
number 1 above correspondes to a two-dimensional array, number 2
above to a one dimensional array, and number 3 above refers to a
single field item.

No View which is used in the Rules Language is allowed to have
more than three (3) occurs Attributes in any of its
qualification paths. Also note that the subscripts are written
such that the leftmost subscript correspondes to the topmost
View with multiple occurrences along the path from X to Vn.

A view can be nested up to 20 levels deep. In other words,
given that the level numbers increase as follows:

01   03   05   07   .....

the highest level number supported is 39.

Constants

Constants appear in the Rules Language in two manifestations:

- literals, and

- Set symbols.

They can represent:

- characters, such as "New York City," or

- (signed) integer numbers, such as 123 or 1234567, or

- (signed) decimal numbers such as 123.45 or 1234.50.

Numeric Literals

There are two types of numeric literals: integer numbers and decimal numbers. An integer is a sequence of one or more digits. A decimal number is a sequence ofone or more digits followed by a decimal point which may be followed by zero ormore digits. A negative number is expressed by preceding the digits with a minus sign.

For example, 0 and 123 are integers. 123.0, -7734.33 and 123.456 are valid decimal constants as is 0.456.

These literals have restrictions upon the number of digits they contain depending upon their type (integer or decimal). Integers consist of up to 15 digits while decimals contain up to 16 digits (15 + 1 for the decimal point). Positive numbers may not be preceded by a plus sign but negative quantities must be preceded by a minus sign.

Character Literals

A character literal is a '(single quote) followed by zero to 50 character (other than ') followed by' a'. The following are valid character literals.

'This is a valid character constant'

'ZYZZY and PLUGH are magic words'

The last example is a null string. If it is necessary to include a single quote character in the literal itself, the usual dodge of using two consecutive single quotes may be employed. For example, 'Mike' 's computer is broken.' is

Mike's computer is broken

Note that single quotes must be used. Double quotes are not valid.

Sets and Symbols

A set is a collection of constant value data items. All constants are of the same data type. For example, all of them will be CHAR(6) or all of them will be SMALLINT. Because of this propety we can refer to the data type of a Set. The constants of a Set behave like Fields rather than views in the following sense:

- They cannot be broken down into lower levels and

- they cannot have an Occurs clause.

- In addition, the whole Set does not have an Occurs clause.

Example:

```
SET     MONTHSET        SMALLINT,
        JAN             VALUE 1,
        FEB             VALUE 2,
        MAR             VALUE 3,
        APR             VALUE 4,
        MAY             VALUE 5,
        JUN             VALUE 6,
        JUL             VALUE 7,
        AUG             VALUE 8,
        SEP             VALUE 9,
        OCT             VALUE 10,
        NOV             VALUE 11,
        DEC             VALUE 12;
```

The example defines a Set called MONTHSET which is composed of a collection of twelve constants which represent the twelve months of a year. Their symbols are JAN, FEB, ..., DEC and their associated values are integer literals 1, 2, ..., 12.

MONTHSET is of the type SMALLINT which means the format of the values is SMALLINT. There cannt be a VALUE 3.21 nor VALUE "NOT AN SMALLINT" nor VALUE 1234565. This last example is invalid becuase an SMALLINT cannot exceed the number 32767).

This example will be used for further illustration of the Set concepts.

Each of the constants of a set possesses an identifier called a SYMBOL, and a value. The SYMBOL is a vehicle for referencing the underlying value. A Set symbol can be used in the same way as a Field. The principal difference is that the value of a Set symbol is constant and can never be altered through a Rules statement, whereas the value of a Field can be changed; for example, by clearing it or making it the target of a MAP or OVERLAY Statement.

Assume SYMXXX is a symbol belonging to a Set SETYYY. It can be referenced in either of the following ways:

SYMXXX

SYMXXX IN SETYYY

The IN keyword was chosen instead of the OF keyword to avoid overloading the meaning of the latter with too many different uses. SYMXX must be qualified with its Set if SYMXX is used, within the Rule, either as the symbol of another Set or as a Field name or as a View name.

Referring back to the MONTHSET example:

```
MAR
MAR IN MONTHSET
3
``` note that each have exaclty the same meaning, namely the number three

```
MAP   FEB IN MONTHSET        TO XXXVAR OF YYYVIEW
``` has the effect of moving the value 2 into the Field XXXVAR which is, hopefully, properly declared somehwere within the Rule or its bind file as a numeric sub-Field of the View YYYVIEW.

Within a Set, there cannot be two or more symbols with the same symbolName. Note though that a Set can possess several symbols with one and the same value!

Other Identifiers

Besides data items, the following entities are used within a Rule:

- Rule Name
- Component Name
- Window Name
- Set Name

They will be described in detail during the discussion of the excutable statements where they occur.

Local Declartions

On ocassion, it is convenient to have variables local to a Rule program. A variable used as the indexing variable of an indexed DO is a good example of such a variable. The DCL ... ENDDCL statement permits the declaration of local variables.

Syntax

The DCL ... ENDDCL statement has the form:

```
DCL declaration;    [declartion; ... ]
ENDDCL
``` where declaration is either

```
          [identifier  [ (S) ]
[,        identifier   [ (S) ], declare_type
``` or

```
EXTERN  identifier
     [,    identifier, ... ]   SET
```

"(s)" is a subscript (integer constant in parentheses).

Declare type as either of the following:

```
SMALLINT
INTEGER
CHAR
LIKE already_declared_item
```

Note: Declaratins of the type EXTERN cannot be subscripted. "identifier" must start with an alphabetic character. The following characters are either alphabetic,numeric, or underscores. already_declared_item refers to an item which is alredy known to the Rule either through preparation from the HPS Repository or through a previous local declaration.

An example follows:

```
DCL

I,J,K,L,M,NM         INTEGER;
    SSN                  CHAR(11);
    TEMP_ID              CHAR(#@);
    TEMP_VIEW            LIKE RTAXCMPI(5);
ENDDCL
```

Figure 10   Example DCL...ENDDCL STATEMENT

Note that it is *not* possible to directly define a View within a DCL ... ENDDCL statement. It is possible to do so indirectlywith the LIKE clause. In the above example, TEMP_VIEW is a temporary local View with nearly the same structure as RTAXCMPI. The only difference is that the 01-level name is TEMP_VIEW rather than RTAXCMPI and the TEMP_VIEW OCCURS 5 times.

APPENDIX D:   Executable Statements of Rules Language

Assignment of Value

Three types of statements alter the value of data contained in Fields and Views: MAP, CLEAR, and OVERLAY. The syntax and semantics of each will be described in turn.

MAP STATEMENT

Syntax

The syntax of the MAP statement is:

MAP data_item TO variable, where data_item is a constant, a Field name, or a View name and variable is either a Field name or a View name. Recall that the Field or View names must be unambiguously qualified and these names may include subscripts.

Some examples follows:

MAP 'Syntax' TO CG_CHAR OF CG_VW_11

MAP CG_CHAR OF CG_VW_11 TO CG_CHAR OF SUB_VIEW OF
    CG_VW_13(3)

MAP 23400.00 TO CUST_BAL_AMT

Figure 1 Example Map Statements

Semantics

The results of mapping A to B, as an example, can vary greatly depending on the data types of A and B. One can see how those assignments work by studying the following matrix built according to the following principle:

The possible sources (A) for a MAP statement constitute the rows of the matrix and the possible destinations (B) constitute its columns. The syntactic correctness or result of the MAP opertion is given at the intersection of the row and column. The numbers in parentheses refer to the numbered paragraphs immediately following the matrix. VW(5) and VW(8) are two Views--both with the multiple occurrences but one with fewer (5) and the other with more (8).

| Source (A) | (B) View | Destination Field | Const | VW(5) | VW(8) |
|---|---|---|---|---|---|
| View | OK (1) | ERROR | ERROR | WARNING (3) | WARNING (3) |
| Field | ERROR | (4) | ERROR | ERROR | ERROR |
| Num lit | ERROR | (6) | ERROR | ERROR | ERROR |
| Char lit | ERROR | (5) | ERROR | ERROR | ERROR |
| Set | ERROR (2) | ERROR | ERROR | ERROR | ERROR |
| Symbol | ERROR | (6) | ERROR | ERROR | ERROR |

| | | | | | |
|---|---|---|---|---|---|
| VW(5) | WARNING | ERROR | ERROR | OK | WARNING |
| VW(8) | WARNING (3) | ERROR | ERROR | WARNING (3) | OK |

---

Figure 2 The Map Operation

(1) Mapping a View to a View means mapping all sub-Views and/or Fields with corresponding names which are subordinate to the source View and the destination View. For example, assume we have:

```
VIEW_1                          VIEW_2
    ABC                             OPQ
    DEF occurs (50)                 ABC
    OPQ                             DEF occurs (9)
    XXX                             BBB
    BBB                             ZZZ
    XXY
    XYZ
``` where the specifics of the sub-Views and the Fields of VIEW1 and VIEW2 do <u>not</u> matter. Then, MAP VIEW_1 TO VIEW_2 will have the folowing effect:

```
ABC OF VIEW_1         is moved into  ABC OF VIEW_2
OPQ of VIEW_1         is moved into  OPQ OF VIEW_2
BBB OF VIEW_1         is moved into  BBB OF VIEW_2
DEF OF VIEW_1 (1)     is moved into  DEF OF VIEW_2 (1)
DEF OF VIEW_1 (2)     is moved into  DEF OF VIEW_2 (2)
DEF OF VIEW_1 (5)     is moved into  DEF OF VIEW_2 (5)
```

Notes: Nothing is mapped from xxx, xxy, xyz to anywhere because VIEW_2 does <u>not</u> have children with those names directly below it. Nothing is mapped int zzz because VIEWW_1 does not have a child with this name directly below it.

Assume that xxx and zzz are themselves Views which are built as follows:

```
xxx                 zzz
FLD1                FLD1
    FLD2                FLD3
    FLD3                FLD5
```

FLD1 OF xxx OF VIEW_1 is <u>not</u> moved into FLD1 OF zzz OF VIEW_2

FLD3 OF xxx OF VIEW_1 is <u>not</u> moved into FLD3 OF zzz OF VIEW_2

The reason is that only the children directly below the source (= VIEW_1) and the target (= VIEW_2) of the MAP statement are eligible candidates for matching names. That is, the codegenerator only look one level down when performing comparisons of View structures.

(2)  A Set isneither a constant, nor a variable, and absolutely nothing can be mapped from or to a Set.

(3)  Assume tht A occurs nn times and B occurs mm times and that min denotes the smaller one of mm and nn. Then:

MAP   A  TO  B means exactly the same as the following Rule fragment:

DO FROM 1 TO min INDEX IX
        MAP A(IX) to B(IX)

ENDDO

If either A occurs multiple times and B does not or A occurs once and B multiple times, then MAP A TO B is equivalent to eithr

MAP A(1)   TO B or

MAP A      TO B(1)

(4)  See the Field-to-Field MAP in Figure 2. A cource literal of type INTEGER or DECIMAL behaves the same as a variable of that type.

(5)  See the Field-to-Field MAP in Figure 2. A source literal of the form 'ABCDEFGH' behave the same as a variable of type CHAR(8).

(6)  See the Field-to-Field MAP in Figure 2. A source which is a symbol belonging to a Set of a given type behaves in the same way as a variable of the same type.

Mapping of VARCHAR Fields

The following describes how MAP statements operate with variables of type VARCHAR.

The major difference between variables of type VARCHAR (nn) and those of type CHAR (nn) is due to the fact that VARCHAR (nn) variables have an associated lenth Field, named xxx_LEN for a VARCHAR variable xxx. xxx_LEN contains the "actual lenth" of xxx while nn is the "maximal length" of xxx.

Assume that B is a variable of type VARCHAR with lenth B_LEN and that A is a variable, a literal, a symbol of type VARCHAR, or of type "char." B_LEN is determined from the length of A in a MAP A TO B statement as follows.

If length of a <=maximum length of B, then:

B_LEN      =lenth of A
        contents of B = contents of A padded with spaces to the right If length of A >maximum length of B, then:

B_LEN    =maximal length of B
    contents of B=first "max length of B" charachters
    of A Examples of the Use of VARCHAR Variables Assume the following:

CHAR_VAR1       of type CHAR (10)
    CHAR_VAR2       of type CHAR (20)
    VARCH_VAR1      of type VARCHAR (15)
    VARCH_VAR1      of type VARCHAR (20)

Assume also that we have a Rule which consists of the following MAP statements:

1.  Map 'ABC    '                    TO CHAR_VAR_1
    2.  MAP ' MY LENGTH IS 20 '      TO CHAR_VAR_2
    3.  MAP 'ABC    '                    TO VARCH_VAR_1
    4.  MAP CHAR_VAR_1                   TO VARCH_VAR_1
    5.  MAP CHAR_VAR_2                   TO VARCH_VAR_1
    6.  MAP CHAR_VAR-2                   TO VARCH_VAR_2
    7.  MAP VARCH_VAR_2                  TO VARCH_VAR_2
    8.  MAP VARCH_VAR_1                  TO VARCH_VAR_2

The following results will occur in the VARCHAR variables

| | |
|---|---|
| #1 and 2 | Nothing has yet been assigned to VARCH-VAR_1_LEN and VARCH_VAR_2_LEN |
| #3 | VARCH_VAR_1_LEN = 5 = length of 'ABC' |
| #4 | VARCH_VAR_1_LEN = 10 = length of CHAR_VAR_1, |
| #5 | VARCH_VAR_1_LEN = 15 = length of CHAR_VAR_1, contents of VARCH_VAR_1 will be ' ** MY LENGTH IS' |
| #6 | VARCH_VAR_1_LEN = 20 = length of VARCH_VAR_1, contents of VARCH_VAR_1 will be ' ** MY LENGTH IS' 20' |
| #7 | VARCH_VAR_1_LEN = 15 = length of VARCH_VAR_1, contents of VARCH_VAR_1 will be ' ** MY LENGTH IS' |
| #8 | VARCH_VAR_1_LEN = 15 = length of VAR_VAR_1, contents of VARCH_VAR_1 will be ' ** MY LENGTH IS' |

CLEAR Statement

The CLEAR statement sets numeric Fields to zero and character Fields to blank.

Syntax

The CLEAR statement has the form:

CLEAR variable where "variable" is fully or partially qualified name of either a View or a Field. If the variable being cleared has subscripts, that is, multiple occurrences of any of its Views or sub-Views, then subscripts may also appear. For example,

CLEAR VW_1 will zero all the numeric Fields of VW_1 and blank the character Fields. Recall that numeric Fields include INTEGER (n), DECIMAL (p, q). and Fields desribed with PIC elements S,9,and V. Character Fields include CHAR (n_, VARCHAR (n).

Semantics

A Field of underlying type "Character" (not including PICs) is set to blanks. A Field of underlying type "Numeric" (including decimals and PICs) is set to zero.

A View V, say, is treated as follows:

(1) Assume that V owns Fields only but no View. Then each one of those Fields is Set to spaces or to zero, depending on whether its underlying type is "Character" or "Numeric." If V is a View that is subscripted (the corresponding OCCURS clauses could possible be specified on a higher level than that of V), then clearing V means the same as clearing each v(S1) or v(S1, S2) or v (S1, S2 S3). Here S1, S2 and S3 denote the Subscripts of V and it depends on the number of OCCURS above and including the level of V, regardless of whether V is subscripted once, twice, or three times.

(2) If V has one or more views V1, V2, ..., as children, then treat V as follows: Clear the Fields which are children of V, just as was outlined above. Then check each V1, V2 to determine whether or not it also contains Fields as children and, if so, treat them according to (1) above. Otherwise examine each sub-View.

The net result of the above algorithm is as follows. Any View is ultimately partioned into a Set of Fields. Each of those Fields is set to spaces or to zero, depending on whether its underlying type is "Character" or "Numeric."

OVERLAY Statement

This statement is used to replace ("overlay") one structure in storage with the content of another.

Syntax

The OVERLAY statement has the form

OVRLAY data item TO variable where data item is a constant, Field, or View and variable is either the name of a View or a Field.

Semantics

As in the case of the MAP statement, the effect of OVERLAY is complex and depends upon the types of the source and destination variables.

| Source (A) | Destination | | | | |
|---|---|---|---|---|---|
| | View | Field | Const | VW(5) | VW(8) |
| View | OK (1) | (4) | ERROR | WARNING (3) | WARNING (3) |
| Field | (4) | ERROR | ERROR | WARNING (3) | WARNING (3) |
| Num lit | ERROR | ERROR | ERROR | ERROR | ERROR |
| Char lit | (5) | ERROR | ERROR | ERROR | ERROR |
| Set | ERROR (2) | ERROR | ERROR | ERROR | ERROR |
| Symbol | (10) | ERROR | ERROR | ERROR | ERROR |
| VW(5) | WARNING (3) | WARNING (3) | ERROR | OK | WARNING (3) |
| VW(8) | WARNING (3) | WARNING (3) | ERROR | WARNING (3) | OK |

Figure 3   The Overlay Operation (1a) The Overlay statement operates in a fundamentally different way from the MAP statement. If the source (S) and destination(D) variables are both Views, then OVERLAY S to D has the same effect as a straight COBOL Move. both S and D are treated as if they were of type Character. Let nn be the smaller of length(S) and length(D). Then the above statement will simply move the left most nn characters of S into the leftmost nn characters of D, padding the excess bytes of D with spaces if length(D) is greater than length(S).

(1b) if A is a View and B is a Field, then OVERLAY A TO B is OK as long as B is of type "character" (which is the case for PIC Field).

(1c) Either A or B or both must be a View. Nothing can ever be OVERLAYED to a Constant.

(2) A Set is neither a constant, nor a variable, and absolutely nothing can be OVERLAYed from or to a Set.

(3) Assume that A occurs nn times and B occurs mm times and that min denotes the smaller one of mm and nn. then OVERLAY A to B means exactly the same as the following Rule fragment:

```
DO FROM 1 TO min INDEX IX
    OVERLAY A(IX) to B(IX)
ENDO
```

If either A occurs multiple times and B does not or A occurs once and B multiple times, then OVERLAY A TO B is equalent to either

OVERLAY A(1)    TO B

.or

OVERLAY A    TO B(1)

(4) It is permitted to OVERLAY a Field with a View or vice versa, as long as the Field is of type "Character." The reason is that Views themselves re considered to be of type "Character" (COBOL convention).

(5) It is permitted to OVERLAY a constant (literal or symbol) to a View, as long as the constant is of type "Character."

APPENDIX E: Flow of Control With a Rule

The Rules Language employs the usual flow of control constructs: IF and IF ... ELSE for conditions execution, CASEOF for selection of one of several alterntives,and DO...WHILE for control of repetitive loops.

Conditions

A condition is a mix of data items, relational operators, Boolean operators, and parentheses. A data item includes character, integer, and decimal constants, Fields, and Views. the relational and Boolean operators are:

| Operator | Meaning |
| --- | --- |
| = | Equal to |
| <> | Not equal to |
| < | Less than |
| <= | Less than or equal to |
| > | Greater than |
| >= | Greatern that or equal to |
| INSET | Is a member of |

|        |                     |
|--------|---------------------|
| AND    | Conjunction         |
| OR     | Inclusive disjunction |
| NOT    | Negation            |

Figure 1  Relational and Boolean Operators

A condition is either a single relational condition (henceforth called a "simple condition") or two or more simple conditions connected with the Boolean operators. A simple condition has the form >   data item      relational operator      data item Some examples are:

>   CUST_BAL_AMT < 1000
>   GROSS_PAY OF RTAXCMPI >= FICA_CUTOFF
>   CUSTOMER_ID <> '1134-4'
>   SSN OF RTAXCMPO = '360-32-2528'
>   12 INSET MONTH_OF_YEARS

The Rules Language enforces data-type checking; comparisons can only be made between data items of like type--numeric with numeric and character with character. All of the comparisons of magnitude are available with numeric data but only tests for equality (=) and inequality (<>) are permitted with character data.

Each simple condition results in a value of either TRUE of FALSE. two of these values can be combined with the Boolean operators AND and OR and the sense of one of them can be reversed with NOT.

For example,

>   CUSTOMER_ID <> '1134-4' AND GROSS_PAY >= FICA_LIMIT is TRUE if both CUSTOMER_ID is not equal to 1123-4' and GROSS_PAY is greater than or equal to FICA_LIMIT; otherwise the condition is FALSE. It is assumed that CUSTOMER_ID is either CHAR, VARCHAR, or a View and GROSS_PAY AND FICA_LIMIT are INTEGER, DECIMAL, or desribed with numeric PIC elements. Further, for this condition to make sense, the relational operators <> and >= must be applied before the two resulting values are ANDed. This implies all the opertors have hierarchy of precedence. The usual hierarchy is used, and it is given in the following table.

| Operator | Precedence |
|----------|------------|
| INSET    | Highest    |
| =, <>, <, <=, >, >= | |
| NOT      |            |
| AND      |            |
| OR       | Lowest     |

Figure 2  Precedence - Relational and Boolean Operators

The concept of operator precedence is well known from the everyday usage of arithmetic calculations, where multiplication and division are executed before addition and subtraction.  In the same way, a test for inequality is executed before two conditions are ANDed, which itself will be done before my conditions will be ORed.

parentheses may be used to override the operator precedence. For example,

> NOT X = Y or C >D is equivalent to (NOT X+Y) or (C>D), which itself is equivalent to X <> Y or C > D.

however,

> NOT (X = Y OR C > D) is equivalent to X <> Y AND C <=D (because it is true in general that NOT (X OR Y) is the same as (NOT X) AND (NOT Y).

The removal of the NOT shows that the two conditions are quite different.  So long as the comparisons are legitmate the conditions can become arbitrarily complex.  For example > (( PAY > LIMIT or BONUS >= MAX) AND ID <>'112A-3x') OR ID= ' ' is syntactically correct.

INSET Statement

A Set can be tested to determine whether a given variable or constant appears as a value within the Set.

Let X be a data item whose data type is compatible to (even though not necessarily identical to) data-type-of-the-Set.

> Then
>
> X INSET SET_NAME is a condition which evaluates to either TRUE or FALSE depending on whether or not at least one of value in SET_NAME matches the value of X.

It is not permitted to check whether a numeric data item is INSET a Set of type character and vice versa.  Note that PICTURE Fields and/or set symbols an be compared to both character and numeric data items.  Note also that a View is considered, for comparison purposes, to behave like a character variable.

Assume the following delcarations:

```
CHRVAR1      CHAR (10),
CHRVAR2      CHAR (6)
SHRTINT      SMALLINT;
LONGINT      INTEGER;
```

```
SET  MONTHSET       SMALLINT,
     JAN            VALUE 1,
     FEB            VALUE 1,
     - - - - - - - - -
     - - - - - - - - -
     - - - - - - - - -
     DEC            VALUE 12;

SET NAMESET    INTERGER
     AL             VALUE 4
     JAN            VALUE 12345
     JAMES          VALUE 1234567,
     JIM            VALUE 12345677,
     JON            VALUE 123456788
     BOB            VALUE 123456789;
```

The following expressions are valied:

```
JAN IN MONTHSET INSET NAMESET     *>Results=FALSE<*
AL   INSET NAMESET                *>Results=TRUE<*
AL <=   JAN IN MONTHSET           *>Results=FALSE<*
AL <=   JAN IN NAMESET            *>Results=TRUE<*
AL <=   AL IN NAMESET             *>Results=TRUE<*
AL <=   AL NAMESET                *>Results=FALSE<*

SHRTINT INSET NAMESET
LONGINT INSET MONTHSET
```

Of course, nothing can be said at code generation time about the results of the last two expressions because they involve variables. It might have come as a surprize to the reader that:

JAN IN NAMESET INSET    MONTHSET    evaluates to FALSE?

Comparison of like types is rigidly enforced. Comparisons between numeric data and non-numeric are always erros. The following table gives conditions arising between the comparison of two character types and or twonumeric types. The significane of note (1), however, varies according to the types being compared.

| First | Literal | Second Set symbol | Variable |
|---|---|---|---|
| Literal | Error | Warning | (1) |
| Set Symbol | Warning | Warning | (1) |
| Variable | (1) | (1) | OK |

Figure 3  Character and Numerican Comparison Error Conditions

(1)   Comparing a character constant to acharater variable is permitted so long as the length of the constant is less than or equal to the maximal length of the variable.
Otherwise a syntax error is generated.

It is an error to compare a large (in absolute value)
numericliteral with a variable which is "toosmall" to
accomodate a value that large. For example, an SAMLLINT
Field can accommodate values ranging from -32,768 to
+32,767. Let SMALL_INT be an SMALLINT Field. The
following comparisn is not permitted by the Rule code
generators:

SMALL_INT > 1000000

Even more subtle errors are detected. Let POS-NUMBER be a
decimal number described by the picture "PIC 9999/V99" in the
HPS Repository. Then the next example conditionis also not
permiteed:

POS_NUMBER < 0 this is an error because POS-NUMBER does not have a leading sign
picture element S.

Not: On the comparison of character type items assume that X= 'ABC' and Y = 'ABC' and Z= 'ABC    '. Then X and Y and Z are all equivalent as far as testing them for equality is concerned.

In other words, the complex condition X = Y and Y=Z and X=Z evaluates to TRUE. In addition, note that the ASCII collating sequence and not the EBCDIC collating sequence applies for relative comparison. Given the above definition, the condition

X <= '1BC' yields TRUE because the ASCII value of 1' is 49, whereas the ASCII vlue of 'A' is 65.

IF STATEMENT

IF..., IF ... ELSE (Conditional Execution)

Syntax

The IF statement has the general form

IF condition
    statement ...

[ELSE statement ...]

ENDIF where "condition" is a logical expression which may be either
TRUE or FALSE. "Statement" represents a Rules Language
statement, and "..." means that the immediately preceding item may be repeated, and [ ] implies, and [ ] implies that what iscontained within [ and ] is optional.  A then is not allowed in the IF statement.

CASEOF Statement

CASE (Selection of One of Several Alternatives)

The CASEOF statement selects one of seveal alternative execution paths on the basis of the value of a character or numeric Field. It is equivalent in meaning to several nested IF ... ELSE STATEMENTS.

Syntax

The CASEOF statement has the following form:

```
    CASEOF VARIABLE

CASE literal [ literal ] ...

[ statement ... ]

[ CASE literal [ literal ] ...

[ statement ... ] ] ...

[ CASE OTHER

[ statement ...] ]

ENDCASE
```

The notation used here to express the syntax is more complex than that used for the IF statement.  Square brackets ([ and ]) enclose items that may be omitted.  Ellipses (...) indicate that the immediately preceding item may be repeated.  Putting these two conventions together means that [ statement ... ] is equivalent to no statements, anything within [ and ] is optional) or one statement, two statements (...following statement means that it can be repeated), three statements, and so on.

Semantics

The CASEOF statement is a shorter way of expresssing the same flow of control using nested IF ... ELSE statements.  The variable is compared to the list of literals following the first CASE reserved word.  If it is equal to any of them then the statements following the first CASE are executed up to but not including the second CASE; flow of control then passes to the statements following the ENDCASE.

If the variable is not equal to any of the literals following the first CASE clause, then it is compared to the literals following the second CASE.  If the variable is equal to any of them, then the statements following the second CASE clause up to, but not including the third CASE are performed; flow then passes to the statements following the ENDCASE.

This proess is repeated until all of the CASE clauses have been exhausted. The statements following the optional CASE OTHER are performed only if the variable in the CASEOF clause is not euqal to any of the leterals listed in the CASE clauses.

the literals appearing in the various CASE clauses must appear only once. A literal appearing in one of the CASE clauses cannot be repeated in another.

The following shows a skeleton example of the use of a CASEOF construct along with the semantically identical translation to a Set of nested IF statements.

```
              CASE OF TRANS_CODE

CASE 'A'  'C' statement 1
    statement 2

CASE 'M'  'R'  'D' statement 3

CASE 'X' statement 4
    statement 5

CASE OTHER statement 6

ENDCASE
```

The IF statement equivalent of the above follows:

```
    IF TRANS_CODE = 'A' OR TRANS_CODE = 'C' statement 1
        statement 2

ELSE

IF TRANS_CODE = 'M' OR TRANS_CODE = 'R' OR TRANS-
            CODE = 'U"

statement 3

ELSE

IF TRANS_CODE = 'X' statement 4
        statement 5

ELSE
``` statement 6

ENDIF
  ENDIF

ENDIF

Observe that the CASEOF statement implicitly uses tests for equality between a varible (Field or View) and a constant. The type checking enforced with the IF statement is also enforced here. Constants appearing in the CASE clauses must have the same type as the variable appearing on the CASEOF clause.

DO Statement

The DO ... ENDDO construct provides control of repetitive loops and there are two varieties--one with an explicit loop-counting mechanism and one without.

Syntax

The form of the DO ... ENDO loop control structure is as follows:

```
            DO

[ statement ... ]

WHILE condition

[statement ... ]

UNDDO
```

The form with the explicit loop-counting mechanism is:

```
    DO [FROM integer data item]
       [ TO integer data item]
       [ BY integer data item]
       [ INDEX integer variable]

[ statement ... ]

[ WHILE condition ]

[ statement ... ]

ENDDO
```

The "condition" appearing in the WHILE clause is the same type of condition as described above in the section of the IF statement. An "integer variable" is either a Field which is defined as INTEGER in the Repository or is a DCL local to the Rule. An "integer data item" is a liteal, a Set constant, or the name of a Field defined as INTEGER. if needed to resolve any ambiguity, partial qualification and subscripting may be required with Field names.

Some examples of DO-loops follows:

```
DO
WHILE FICA OF RTAXCMPI <FICA_MAX_IN PARAMETERS
      statement1
      statement2
...
ENDDO DO
      statement1
      statement2
...
WHILE TOTAL_AMT > TOTAL_LIMIT
ENDDO DO TO LOOP_END BY STEP INDEX COUNTER OF RXYZZYI
      statement1
      statement2
...
ENDDO DO FROM LEVEL OF RSTATUSI
      statement1
      statement2
WHILE CODES (LEVEL) <> TERM_CODE IN VALID_CODES
      statement3
...
ENDDO
```

Semantics

For the first type of DO construct--without the explicit counting mechanism--the statements between DO and ENDDO are repeated in order of appearance while the condition in the WHILE clause is TRUE. When the condition becomes FALSE, control passes from the WHILE clause to the statement following the ENDDO. Note that the while clause may appear at the top of the loop, at the botton of the loop, or anywhere in the middle.

In the second type of DO, default values are supplied for any of the missing clauses (FROM, TO, BY). If FROM is omitted, the loop count begins at 1; if TO is omitted, the count limits is set to 32,767; if BY is omitted, the loop increment is set to 1. Note that the INDEX clause need not appear. However, at least one FROM, TO, BY, or INDEX must be given for the DO to be recognized as in indexed DO. Also, IN, FROM, TO and BY values need not be integer constant; integer Fields are also permitted. Finally, a WHILE condition may also be included with an indexed DO and it may appear anywhere within the loop.

APPENDIX F: Transfer of Control Between Rules

A Rule may invoke another Rule or a Component. A Component may invoke another Component, but not a Rule.

USE Statement

Syntax

The USE RULE statement invokes another Rule and the USE MODULE statement invokes a component. They are similar in appearance:

```
USE RULE rule-name      [ NEST ]
USE MODULE components_name
``` where rule_name is the name of a Rule and component_name is the name of a Component known to the Repository.

Semantics

Upon execution of USE RULE or USE MODULE, control is passed to the named Rule or Component. Unlike programming languages, the USE statement itself does not have associated with it any of the parameters to be passed to the invoked Rule or Component.

The Rules Language requires that the input View and the output View of a Rule be defined in the Repository not within the program per se. Furthermore, the input View to be passed to an invoked Rule and the Output View to be retrieved from it <u>must</u> also be recorded in the Repository for both the invoking and invoked Rules.

Semantic Checks For Target Environments

In a system having the architecture of an IBM mainframe, an IBM mini computer supporting Stratus VOS operating system, and PC work stations, only a PC-base Rule may invoke a Rule belonging to a different target environment. The code generator will flag an error if one should attempt to USE a Stratus Rule or a PC Rule from a mainframe Rule or if one should attempt to USE a mainframe Rule or a PC Rule from a Stratus-based Rule. Note also that a Rule can only USE a Component which is targeted for its own environment.

Semantic Checks For NEST Clause

The Nest option indicates that all Windows invoked by this Rule and its calling Rules will come up in "pop up" mode; i.e., it will be displayed over the screen that was conversed prior to this one. NEST can be used only if:

- the Target Environment of the USEing Rule is PC, or

- The Target Environment of the used Rule is PC.

However, Rules on other machines cannot invoke a PC-based Rule (except indirectly through the ASYNC facility).

RETURN Statement

An invoked Rule program executes the RETURN statement to transfer control back to the invoking Rule. The RETURN statement may be laced anywhere in a program. The Rules Language code generator places an implicit RETURN at the end of each Rule program.

Transfer of Data Between Rules

As was mentioned in the previous section, Rules may have at most one Input View and one Output View defined in the Repository. With this in mind, the following restrictins apply concerning flow in the tranfer of data:

- A Rule may not modify its Input View unless it also happens to be its Output (i.e, INOUT).

- A Rule may not modify the Output View of a module it calls unless it is the same as the modules Input.

- A Rule may not share its Input View with that of its child's Output. View sharing is permitted between Rules of the same level and when the Views are the same Usage (i.e., both Input).

- Output View of Rules and the Input Views of modules it calls, are cleared upon invocation, as are locally declared Views.

Converse Support Structures

The CONVERSE WINDOW supports communication between Rules programs in the personal computer environment and the user of a system.

The statement has the form:

CONVERSE WINDOW WINDOW_NAME where WINDOW_NAME is the name given to the display when it was entered into the HPS Repository.

Note that there is a difference between WINDOW_NAME and Window View. Each WINDOW_NAME is associated with a View whichis called its Window View. Not every View in the Repository can be used as a Window View. A Window View can only have a 01 level, 03 level, and 05 level. Note that a Rule can have more than one Converse statement but never more than one Window Name. Note also that only PC-based Rules can have Converse statements.

Asynchronous Support Structures

This appendix summarizes the rule language constructs that invoke the unsolicited data output (UD) processes. Unsolicited data allows a one rule to send data to another Rule without the latter Rule asking for it. This is supported using the following statements:

- ASYNC ATTACH

- ASYNC DETACH

- ASYNC REFRESH

- ASYNC ROUTE

The following discussion relates to a hardware configuration with an architecture comprised of an IBM mainframe supported by the CICS operating system, a Stratus mini computer and a bank of PC work stations. All of these constructs are currently confined to PC based rules. There also exist Stratus subroutines to execute the following statements.

In defining the PC constructs, we will assume the existence of the following Rule entity instances:

- rpc1    A PC Rule conversing Window wpc1
- rpc2    A PC Rule conversing Window wpc2
- rpc3    A PC Rule refreshing wpc1
- rpc4    A PC Rule refreshing wpc2
- rst1    A Stratus Rule invoking a component which uses the send_message subroutine.

ASYNC ATTACH STATEMENT

Syntax

The ASYNC ATTACH statement has the following form:

ASYNC ATTACH RULE   rpc3 VIA RULE rst1

This command, will <u>initiate</u> the receiving of unsolicited input by the PC Rule rpc3 sent by the Stratus Rule rst1.

Semantic Checking

ATTACH can only be used if:

Execution environment (Repository attribute of the ATTACH'ed rule is PC and VIA RULE is STRAT

ASYNC DETACH Statement

Syntax

The ASYNC DETACH statement has the following form:

ASYNC DETACH RULE   rpc3 VIA RULE rst1

This command performs the exact revers of ATTACH. It may only be used after an ATTACH command, at which point it will discontinue the receiving of unsolicited input by the PC Rule rpc3 sent by the Stratus Rule rst1.

Semantic Checking

Same as for ATTACH.

ASYNC ROUTE Statement

Syntax

The ASYNCH ROUTE statement has the following form:

ASYNCH ROUTE RULE               rpc3 VIA RULE rpc4

This command will switch the action of refreshing a Window from the PC Rule rpc3 to the PC Rule rpc4.

Semantic Checking

ROUTE can only be used if:

Execution environment (Repository attribute) of both Rules is the PC.

ASYNC REFRESH Statement

Syntax

The ASYNC REFRESH statement has the following form:

```
ASYNC REFRESH WINDOW      wpc1
      (FIELD              field_name
      VIEW                view_name
      OCCUR               field_occur
      BEEP
      FLASH )
``` where wpc1 is a Window name and Field_name, view_name and field_occur identify a specific field in this Window. This command will induce the automatic updating of the field specified, so long as the Rule is ATTACH'ed.

Semantics

Assume for the following that Window wpc1 has Window View wv1 which contains an occuring array V1 (a List Box) associated with V1 in turn, includes a field F1. The following command:

ASYNC REFRESH  window wpc1    [refresh options]

with Refresh options BEEP and/or FLASH will cause a beep and/or flashing of the data being refreshed. Either, both, or none of those options may be specified.

Other refresh Keywords are:

1.    FIELD    F1
           VIEW     V1
           OCCUR    I

Result: The List Box V1 will have F1 or V1 OF WV1 (i) refreshed.

2.    FIELD    F1
           VIEW     V1

Result: Every occurence of the field F1 in V1 would be refreshed (i.e., the column).

3.  VIEW    V1
    OCCUR   I

Result: The List Box v1 will have the i'th row refreshed.

4.  VIEW    V1

Result: The entire List Box v1 will be refreshed!

In options 1 and 2, the VIEW clause can be omitted <u>but only if</u> F1 of wv1 is unique within the Rule.

In the above,

> F1 can be the literal name of the field or a variable which contains the name (i.e., is either a character or a field oftype CHAR)

> V1 can be the literal name of the view or a variable which contains the name (i.e,., is either a character or a field of type CHAR)

> i is either an interger or a field of type INTEGER.

Semantic Checking

- WINDOW clause is <u>mandatory</u>.

- The VIEW clause, if given, must specify a sub-View of the View identified by the WINDOW clause.

- The FIELD clause, if given, must specify a Field name Included in the View identified by the View clause.

- If OCCUR is used the View identified by the VIEW clause must be an occurring View.

- The OCCUR literal must be within bounds.

Guidelines Concerning Usage of ASYNCH

- A Rule cannot contain both CONVERSE statements and ASYNC statements

- A Rule which CONVERSES cannot USE a Rule with ASYNC statement and vice versa.

- A Rule given the Repository defined attribute ASYNC, cannot have a USE....NEST statement (because NEST implies that somewhere in the hierarchy of the rules it calls or in itself, there will be a Rule with a CONVERSE).

Each WINDOW_NAME is associated with a View, called Window View. Not any View in the Repository can be used as a Window View. A Window View can only have an O1 level, O3 level, and O5 level. Note that a Rule can have more than one Converse statement but never more than one Window Name. Note also that only PC-based Rules can have Converse statements.

What is claimed is:

1. A method of operating a data processor to generate and distribute a computer program in a computer system, the computer system comprising a plurality of hardware components coupled to form an interconnected computer network, the method comprising the steps of:

A. creating a set of entities, said set of entities comprising a subset of data entities and a subset of process entities;

B. creating a set of relationships, said set of relationships comprising a first predetermined subset and a second predetermined subset;

C. creating and storing a data entity model by performing the steps of
   i. accepting as input to the data processor data relating to a task to be performed by the computer program, the input data characterized according to the sub-set of data entities, said data entities comprising pre-selected organizational categories;
   ii. accepting as input to the data processor information to link the data entities according to the first pre-determined sub-set, said first predetermined subset comprising pre-selected identifying characteristics between data entities;
   iii. operating the data processor to link the input data entities to each other according to the input first determined subset;
   iv. operating the data processor to store the linked set of input data entities and input first predetermined subset in a storage area;

D. creating and storing a hierarchical process model by performing the steps of
   i. accepting as input to the data processor information relating to a procedure for accomplishing the task to be performed by the computer program, the input information characterized according to the subset of process entities, said process entities comprising pre-selected process organizational categories;
   ii. said input process entities forming a first part of the hierarchical process model, said hierarchical process model comprising a representation which divides the function of the computer program into discrete sub-tasks, said discrete sub-tasks comprising descriptions of the functions of pre-selected sections of the computer program and the processing requirements for implementing those functions, said descriptions forming said input process entities;
   iii. accepting as input to the data processor information to link said input process entities to each other and to selected ones of the input data entities according to the second predetermined subset, said second predetermined subset forming a second part of said hierarchical process model and comprising descriptions to identify dependencies between the set of entities;
   iv. operating the data processor to link the input set of entities identified by the input information of (D)(iii) according to the input second predetermined subset to create the hierarchical process module;
   v. operating the data processor to store the linked entities, which form the hierarchical process model, in the storage area;

E. creating and storing a hardware configuration model by performing the steps of
   i. accepting as input to the data processor information specifying connectivity data for the computer network and operational requirements for the operating environments of pre-selected ones of the hardware components;
   ii. operating the data processor to store the connectivity data and operational requirement information in the storage area;

F. creating a link between the information contained in the hardware configuration model and the input process entities contained in the hierarchical process model, by performing the steps of
   i. accepting as input to the data processor information to link the connectivity data and operational requirements information of the hardware components to pre-selected ones of the input process entities to specify an operating environment for execution of the preselected ones of the input process entities;
   ii. operating the data processor to link the connectivity data and operational requirements information of the hardware components to the preselected ones of the input process entities;

G. creating and storing a logic module, the logic module containing a plurality of logic constructs, each of said plurality of logic constructs corresponding to a predetermined one of the input process entities, the creating and storing of said logic module accomplished by performing the steps of
   i. accepting as input to the data processor information comprising logic constructs in a first programming language, each of said logic constructs comprising statements in the first computer programming language that will enable the computer hardware components to perform the discrete tasks specified in a pre-selected one of the input process entities, said logic constructs in the first programming language comprising statements that reference certain ones of the input entities;
   ii. accepting as input to the data processor information that relates each logic construct to a preselected corresponding process entity, the logic construct being designed to perform the function specified by its corresponding process entity;
   iii. operating the data processor to link each logic constant to a corresponding process entity according to the relating information;
   iv. operating the data processor to store the linked logic constructs and the corresponding input which relates each logic construct to the corresponding process entity in the storage area;

H. operating the data processor to generate, for each logic construct, a computer program module, by utilizing the logic constructs, the corresponding input process entities, the linked set of entities and second predetermined subset the linked set of input data entities and first predetermined subset, and the input information that specifies the connectivity data of the hardware components linked to the preselected corresponding ones of the process entities, said computer program modules each comprising computer code that is supported by the operating environment of the hardware component linked to the corresponding pre-selected one of the process entities;

I. operating the data processor to scan the storage area to associate with each generated computer program module the linked ones of the hardware components; and J. operating the data processor to distribute each generated computer program module to the linked ones of the hardware components.

2. The method of claim 1 wherein each computer code module comprises a source code module.

3. The method of claim 2 comprising the further step of distributing each source code module to its corresponding hardware component.

4. The method of claim 3 comprising the further step of operating each hardware component to create an object code module for each source code module distributed to the hardware component by compiling the source code module.

5. The method of claim 2 comprising the further steps of:
   a. operating the data processor to create object code modules for the computer program by compiling each source code module; and
   b. distributing each object code module to its corresponding hardware component.

6. The method of claim 2 wherein the source code comprises statements in a second high-level computer programming language.

7. The method of claim 2 wherein the source code comprises statements in a third-generation programming language that is supported by the operating environment of a preselected hardware component.

8. The method of claim 6 wherein the source code comprises statements in COBOL.

9. The method of claim 6 wherein the source code comprises statements in C.

10. The method of claim 1 wherein each computer code module comprises an object code module.

11. The method of claim 2 comprising the further steps of:
   a. operating a data processor to compile each said distributed generated computer program module and create a corresponding object code module that is executable in the operating environment of the corresponding pre-selected ones of the hardware components; and
   b. operating a data processor to link each generated object code module to pre-selected other ones of the object code modules, according to the process relationships specified by the hierarchical process model.

12. The method of claim 1 comprising the further steps of:
   a. providing in a data processor a computer code component module that is configured to perform a preselected function and is capable of executing in the operating environments of preselected ones of the hardware components;
   b. providing in the hierarchical process model preselected process entities which describe the functioning and operational requirements of the computer code component modules.

13. The method of claim 12 wherein the computer code component module comprises object code statements, said object code statements capable of execution in an operating environment of a corresponding hardware component.

14. The method of claim 12 wherein the computer code component module performs a graphic-based user interface function.

15. The method of claim 12 wherein the computer code component module performs the transfer of data between two pre-selected object code modules.

16. The method of claim 12 wherein the computer code component module performs the transfer of data between two pre-selected computer code modules designated to operate in the operating environments of two different hardware components.

17. The method of claim 1 comprising the further steps of:
   a. accepting as input to the data processor security access input data comprising information concerning which users may access the computer program and which ones of the pre-selected hardware components have security clearance to execute the computer program; and
   b. operating the data processor to limit the distribution of the computer code modules to the pre-selected hardware components according to the security access input.

18. The method of claim 17 comprising the further step of operating the data processor to permit the users access to the computer program according to the security access input.

19. The method of claim 1 comprising the further steps of: 'a. accepting as input to the data processor information to modify the first computer programming language statements of a logic construct;
   b. operating the data processor to search the storage area and determine if the modification necessitates changes to linked entities in the hierarchical process model;
   c. operating the data processor to generate new computer code by utilizing the modified logic constructs, the corresponding input process entities, the linked set of input data entities and first predetermined subset, and said input information specifying connectivity data of the hardware components linked to the pre-selected corresponding ones of the input process entities; and
   d. operating the data processor to distribute the new computer code modules to the operating environments of corresponding ones of the preselected hardware components.

20. The method of claim 19 wherein the new computer code modules are distributed to the hardware components according to security access input, said security access input comprising information concerning which users may access the computer program and which ones of the pre-selected hardware components have security clearance to execute the computer program.

21. The method of claim 1 comprising the further steps of:
   a. accepting as input to the data processor information to modify data contained in pre-selected ones of the process entities or the second predetermined subset;

b. operating the data processor to search the storage area to determine if the modification information necessitates changes to linked logic constructs;

c. operating the data processor to execute modifications to the linked logic constructs necessitated by the changes to the pre-selected ones of the process entities and second predetermined subset;

d. operating the data processing to generate new computer code by utilizing the modified logic constructs, the corresponding input process entities, the linked set of entities and second predetermined subset, the linked set of input data entities and first predetermined subset, and said input information specifying connectivity data of the hardware components linked to the pre-selected corresponding ones of the input process entities; and e. operating the data processor to distribute the new computer code modules to the operating environments of corresponding ones of the pre-selected hardware components.

22. The method of claim 21 comprising the further steps of:

a. operating the data processor to search the storage area to determine fi the modification information necessitates changes to the linked set of data entities and first predetermined subset; and b. operating the data processor to execute modifications to the linked set of data entities and first predetermined subset that are necessitated by the changes to the pre-selected ones of the process entities.

23. The method of claim 1 comprising the further steps of:

a. accepting as input to the data processor information to modify the preselected organizational categories contained in preselected ones of the data entities or the first predetermined subset between two data entities;

b. searching the storage area to determine if the modification necessitates changes to linked logic constructs or the hierarchical process model;

c. operating the data processor to search the storage area to determine if the modification information necessitates changes to the linked set of process entities and second predetermined subset in the hierarchical process model;

d. operating the data processor to execute modifications to the linked set of process entities and second predetermined subset that are necessitated by the changes to the pre-selected ones of the linked set of data entities and first predetermined subset;

e. operating the data processor to execute modifications to the linked logic constructs necessitated by the changes to the pre-selected ones of the linked set of data entities and first predetermined subset;

f. operating the data processor to generate new computer code by utilizing the modified logic constructs, the corresponding input process entities, the linked set of entities and second predetermined subset, the linked set of input data entities and first predetermined subset, and said input information specifying connectivity data of the hardware components linked to the pre-selected corresponding ones of the input process entities; and g. operating the data processor to distribute the new computer code modules to the operating environments of corresponding ones of the pre-selected hardware components;

24. The method of claim 1 comprising the further steps of:

a. accepting as input to the data processor additional information relating to the functioning of a second computer program;

b. operating the data processor to search the storage area for groups of previously existing process entities and second predetermined subsets in the storage area which describe process functions that are similar to the desired functioning of the second computer program; and c. reusing the part of the hierarchical process model and the logic constructs and distributed computer code modules that describe functions that are similar to the desired functioning of the second computer program.

25. The method of claim 24 comprising the further steps of:

a. accepting as input to the data processor additional information relating to the function of the second computer program;

b. operating the data processor to add the additional information to the corresponding reused process entities of the hierarchical process model; and c. operating the data processor to store the process entities containing the additional information relating to the functioning of the second computer program in the storage area.

26. The method of claim 24 comprising the further steps of:

a. accepting as input to the data processor additional information relating to the functioning of the second computer program, the information specified according to new ones of the pre-selected set of process entities;

b. accepting as input to the data process data to link each of the new ones of the process entities to one or more other new or existing process entities according to one of the second predetermined subset;

c. operating the data processor to link each of the new ones of the process entities to one or more other new or existing process entities according to one of the second predetermined subset to create a new hierarchical process model; and d. storing the new hierarchical process model in the storage area.

27. The method of claim 26 comprising the further steps of:

a. specifying for each new logical construct an operating environment corresponding to one of the preselected hardware components;

b. operating the data processor to utilize the first programming language statements in each new logical construct, the corresponding input process entities, the linked set of entities and second predetermined subset, the linked set of input data entities and first predetermined subset, and the input information that specifies the connectivity data of the hardware components linked to the pre-selected corresponding ones of the input process entities; and c. operating the data processor to distribute the new computer code modules to the operating environments of corresponding ones of the preselected hardware components.

28. The method of claim 1 wherein each of the steps A-J are executed in one of the hardware components.

29. The method of claim 27 wherein each of the steps a-c are executed in one of the hardware components.

30. The method of claim 1 wherein the storage area comprises a relational data base located in a pre-selected one of the hardware components.

* * * * *

UNITED STATES PATENT AND TRADEMARK OFFICE
CERTIFICATE OF CORRECTION

PATENT NO. : 5,295,222
DATED : March 15, 1994
INVENTOR(S) : Wadhwa et al.

It is certified that error appears in the above-indentified patent and that said Letters Patent is hereby corrected as shown below:

The title page, should be deleted to appear as per attached title page.

In the Drawings

Delete the eight (8) sheets of drawings containing Figs. 1-7 and substitute the attached eight (8) sheets of drawings containing Figs. 1-7.

United States Patent
Wadhwa et al.

Patent Number: 5,295,222
Date of Patent: Mar. 15, 1994

[54] COMPUTER-AIDED SOFTWARE ENGINEERING FACILITY

[75] Inventors: Vivek K. Wadhwa, Paramus, N.J.; Faraz Ataie, Brooklyn, N.Y.; Vincent P. Aubrun, New York, N.Y.; Leonid Erlikh, Brooklyn, N.Y.; Michael Fischer, Passaic, N.J.; Michael Fochler; Craig B. Hayman, both of New York, N.Y.; Daniel Hildebrand, Stamford, Conn.; James Hughes, Hartsdale, N.Y.; Jeffrey L. Lambert, East Brunswick, N.J.; Douglas E. Lee, White Plains, N.Y.; Nicholas R. Lim, London, England; Rajan S. Modi, New York, N.Y.; Richard W. Mosebach, Hicksville, N.Y.; Joel M. Moskowitz, New York, N.Y.; Tayo Olowu, New York, N.Y.; Elaine C. Power, New York, N.Y.; Norman Shing, New Hyde Park, N.Y.

[73] Assignee: Seer Technologies, Inc., New York, N.Y.

[21] Appl. No.: 885,924

[22] Filed: May 18, 1992

Related U.S. Application Data

[63] Continuation of Ser. No. 444,060, Nov. 30, 1989, abandoned.

[51] Int. Cl.⁵ .............................................. G06F 15/60
[52] U.S. Cl. ..................................... 395/1; 395/700
[58] Field of Search ............... 395/700, 1; 364/280.6, 364/274.1, 274.2, 274.3, 274.4, 274.5

[56] References Cited

U.S. PATENT DOCUMENTS

| | | | |
|---|---|---|---|
| 4,455,619 | 6/1984 | Masui et al. | 364/90 |
| 4,558,413 | 12/1985 | Schmidt et al. | 364/30 |
| 4,734,854 | 3/1988 | Afshar | 364/20 |
| 4,809,170 | 2/1989 | Leblang et al. | 364/20 |
| 4,833,604 | 5/1989 | Cheng et al. | 364/20 |
| 4,862,345 | 8/1989 | Lekrom | 364/90 |
| 4,866,638 | 9/1989 | Cosentino et al. | 364/90 |
| 4,888,690 | 12/1989 | Huber | 364/20 |
| 4,893,232 | 1/1990 | Shimaoka et al. | 364/20 |
| 4,894,771 | 1/1990 | Kunii et al. | 364/20 |
| 4,930,071 | 5/1990 | Tou et al. | 364/30 |
| 4,939,689 | 7/1990 | Davis et al. | 364/30 |
| 4,956,773 | 9/1990 | Saito et al. | 364/20 |
| 5,084,813 | 1/1992 | Ono | 395/1 |
| 5,202,996 | 4/1993 | Sugimo et al. | 395/70 |

Primary Examiner—Dale M. Shaw
Assistant Examiner—C. Shin
Attorney, Agent, or Firm—Kenyon & Kenyon

[57] ABSTRACT

A computer-aided software engineering facility and method for creating computer source code and executable computer programs that are distributable across multiple hardware environments or platforms. An object oriented modeling system is linked with modules of a computer programming language and other system components to quickly and efficiently design computer source code and executable computer modules that have a high degree of reusability. The modules and models are stored in a centralized storage area and distributed to the various hardware elements that comprise the computer system.

30 Claims, 7 Drawing Sheets

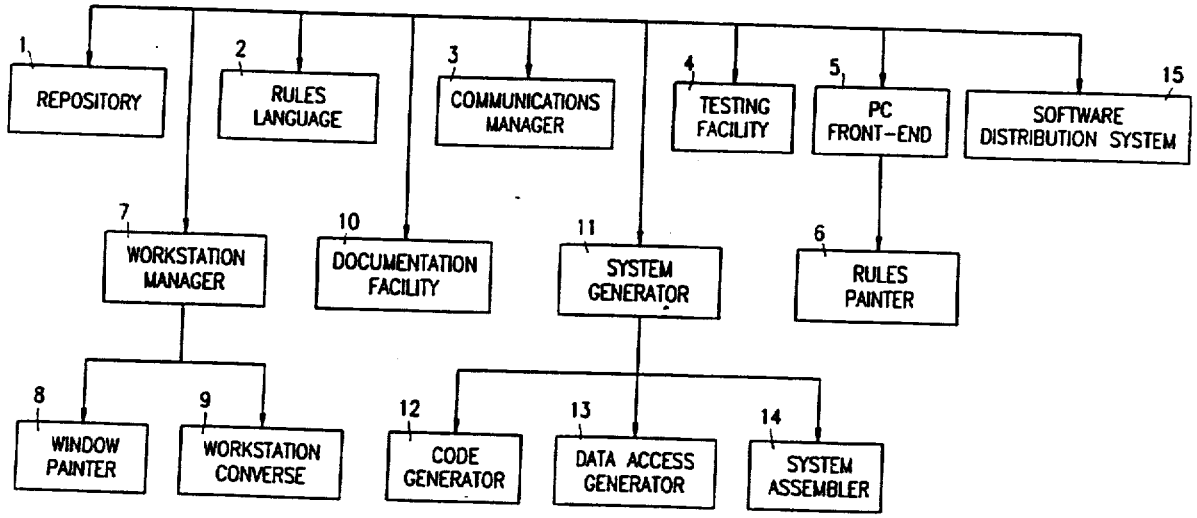

UNITED STATES PATENT AND TRADEMARK OFFICE
CERTIFICATE OF CORRECTION

PATENT NO. : 5,295,222
DATED : March 15, 1994
INVENTOR(S) : Wadhwa et al.

It is certified that error appears in the above-indentified patent and that said Letters Patent is hereby corrected as shown below:

Column 6, line 20, change "date" to --data--;

Column 6, line 31, change "System;"" to --"System";--;

Column 9, line 20, delete --is--;

line 42, change "a" to --an--;

Column 10, line 46, change "a" to --an--;

Column 11, line 39, change "programmer. As" to --programmer, as--;

Column 12, line 4, change "Field" to --Fields--;

Column 12, line 28, change "subroutines. A Rule" to --subroutines. A Rule--;

Column 12, line 30, change "ments. A data" to --ments. A data--;

line 42, change "attached" to --attached hereto.--;

line 56, delete "contained in"

Column 15, line 1, change "PNL" to --.PNL--;

Column 16, line 58, insert --in-- before "other";

Column 17, line 13, change "a" to --an--;

line 30, change "contents" to --contents of--;

UNITED STATES PATENT AND TRADEMARK OFFICE
CERTIFICATE OF CORRECTION

PATENT NO. : 5,295,222
DATED : March 15, 1994
INVENTOR(S) : Wadhwa et al.

It is certified that error appears in the above-indentified patent and that said Letters Patent is hereby corrected as shown below:

```
Column 96, line 38, change "steps of: 'a.  accepting" to
          --steps of:
                      a.  accepting--

Column 97, line 10, change "processing" to --processor--;

line 25, change "fi" to --if--;

Column 98, line 43, change "process" to --processor--
```

Signed and Sealed this

Twenty-eight Day of March, 1995

Attest:

BRUCE LEHMAN

*Attesting Officer*   *Commissioner of Patents and Trademarks*